United States Patent
Nieuwenhuis et al.

(10) Patent No.: US 10,564,446 B2
(45) Date of Patent: Feb. 18, 2020

(54) METHOD, APPARATUS, AND COMPUTER PROGRAM FOR ESTABLISHING A REPRESENTATION OF A SPECTACLE LENS EDGE

(71) Applicants: Carl Zeiss Vision International GmbH, Aalen (DE); Carl Zeiss AG, Oberkochen (DE)

(72) Inventors: Claudia Nieuwenhuis, Essingen (DE); Oliver Schwarz, Ellwangen (DE)

(73) Assignees: Carl Zeiss Vision International GmbH, Aalen (DE); Carl Zeiss AG, Oberkochen (DE)

( * ) Notice: Subject to any disclaimer, the term of this patent is extended or adjusted under 35 U.S.C. 154(b) by 0 days.

(21) Appl. No.: 16/418,844

(22) Filed: May 21, 2019

(65) Prior Publication Data

US 2019/0271858 A1    Sep. 5, 2019

Related U.S. Application Data

(63) Continuation-in-part of application No. PCT/EP2017/083908, filed on Dec. 20, 2017.

(30) Foreign Application Priority Data

Jan. 27, 2017 (EP) .................... 17153651

(51) Int. Cl.
*B24B 13/06* (2006.01)
*G02C 7/02* (2006.01)
(Continued)

(52) U.S. Cl.
CPC .............. *G02C 7/028* (2013.01); *B24B 13/06* (2013.01); *G02C 7/027* (2013.01); *G02C 13/003* (2013.01);
(Continued)

(58) Field of Classification Search
CPC ........ B24B 13/06; G02C 7/028; G02C 7/027; G02C 13/003; G02C 13/005; G06T 7/12;
(Continued)

(56) References Cited

U.S. PATENT DOCUMENTS 4,806,011 A * 2/1989 Bettinger ........... G02B 27/0172
351/158
4,817,024 A * 3/1989 Saigoh ................. G02C 13/003
33/200
(Continued)

FOREIGN PATENT DOCUMENTS

DE    102009004383 A1    7/2009
DE    102011115239 A1    3/2013
(Continued)

OTHER PUBLICATIONS

International Preliminary Examination Report issued in PCT/EP2017/083908, to which this application claims priority and English-language translation thereof, dated Aug. 1, 2019.
(Continued)

*Primary Examiner* — George B Nguyen
(74) *Attorney, Agent, or Firm* — Thrive IP®; Georg Hasselmann

(57) ABSTRACT

A computer-implemented method for establishing the representation of the edge of a spectacle lens or of a left spectacle lens and a right spectacle lens for a spectacle wearer is disclosed. The method includes: providing image data relating to the spectacle wearer with a worn spectacle frame; calculating information data derived from the image data; calculating a deterministically optimizable cost function linking the information data with spectacle lens data, wherein the spectacle lens data describe the spatial extent of at least one spectacle lens held in the spectacle frame; and setting a curve of an edge of the spectacle lens or of the left
(Continued)

spectacle lens and the right spectacle lens by optimizing the cost function.

29 Claims, 11 Drawing Sheets

(51) Int. Cl.
    *G02C 13/00*     (2006.01)
    *G06T 7/12*     (2017.01)
    *G06T 7/149*     (2017.01)
    *G06K 9/00*     (2006.01)

(52) U.S. Cl.
    CPC ....... *G02C 13/005* (2013.01); *G06K 9/00281* (2013.01); *G06T 7/12* (2017.01); *G06T 7/149* (2017.01); *G06T 2207/10012* (2013.01); *G06T 2207/10024* (2013.01); *G06T 2207/10028* (2013.01)

(58) Field of Classification Search
    CPC ........... G06T 7/149; G06T 2207/10012; G06T 2207/10028; G06K 9/00281
    USPC .......................................................... 451/5
    See application file for complete search history.

(56) References Cited

U.S. PATENT DOCUMENTS

| | | | |
|---|---|---|---|
| 4,852,184 A | 7/1989 | Tamura et al. | |
| 6,659,609 B2 | 12/2003 | Mothes | |
| 8,885,926 B2* | 11/2014 | Seung | G06T 7/11 382/156 |
| 2009/0037154 A1* | 2/2009 | Ecabert | G06T 7/12 703/2 |
| 2015/0306707 A1* | 10/2015 | Nicholson | B24C 1/045 700/110 |
| 2016/0246078 A1 | 8/2016 | Choukroun et al. | |
| 2016/0299360 A1 | 10/2016 | Fonte et al. | |

FOREIGN PATENT DOCUMENTS

| | | |
|---|---|---|
| DE | 102014013447 A1 | 3/2016 |
| WO | 0184222 A1 | 11/2001 |
| WO | 2014198888 A1 | 12/2014 |

OTHER PUBLICATIONS

Borza et al.: "Eyeglasses Lens Contour Extraction from Facial Images Using an Efficient Shape Description," Sensors 13, pp. 13638 to 13658, 2013.

Fernandez et al.: "Glasses detection on-real images based on robust alignment," Machine Vision and Applications 26, pp. 519 to 531, 2015.

Hartley et al.: "Multiple View Geometry in Computer Vision," 2nd edition, Cambridge University Press, p. 8, 2004.

Nieuwenhuis et al.: "Spatially Varying Color Distributions for Interactive Multilabel Segmentation," IEEE Transactions on Pattern Analysis and Machine Intelligence, vol. 35, No. 5, pp. 1234 to 1247, May 2013.

Wu et al.: "Automatic Eyeglasses removal from Face Images," IEEE Transactions on Pattern Analysis and Machine Intelligence, vol. 26, No. 3, pp. 332 to 336, 2004.

Ophthalmic optics—Spectacle lenses—Vocabulary (ISO 13666:2012); German and English version EN ISO 13666:2012, Oct. 2013.

International Search Report issued in PCT/EP2017/083908, to which this application claims priority, dated Mar. 26, 2018, and English-language translation thereof.

* cited by examiner

METHOD, APPARATUS, AND COMPUTER PROGRAM FOR ESTABLISHING A REPRESENTATION OF A SPECTACLE LENS EDGE

CROSS REFERENCE TO RELATED APPLICATIONS

This application is a continuation-in-part application of international application PCT/EP2017/083908, filed Dec. 20, 2017, which claims priority to European patent application EP 17 153 651.9, filed on Jan. 27, 2017, both of which are hereby incorporated by reference in their entireties.

TECHNICAL FIELD

The disclosure relates to a computer-implemented method and an apparatus for establishing a representation of the edge of at least one spectacle lens for a spectacle wearer. Moreover, the disclosure relates to a computer program, with which the aforementioned method can be carried out. The disclosure also relates to a method for centering a left or right spectacle lens in a spectacle frame, a method for grinding a left or right spectacle lens into a spectacle frame and also a method for producing a left or right spectacle lens and a method for producing spectacles.

BACKGROUND

The representation of the edge of a spectacle lens is understood by the disclosure to mean a representation of the bearing edge of the spectacle lens constituted in the standard EN ISO 13666:2012 (D/E), section 13.1.

A representation of the edge of a spectacle lens is a dataset, from which the three-dimensional curve of the bearing edge of the spectacle lens facing away from the spectacle wearer can be determined unequivocally as appropriate on the basis of additional variables describing the spectacle lens. A representation of the edge of a spectacle lens can, for example, be the area surrounded by the projection of the edge of the spectacle lens in the image plane of an image sensor of an image capture device, into which area the spectacle lens is projected for the image capture.

In the case of fully rimmed spectacles, the bearing edge of a spectacle lens corresponds to an inner edge of the spectacle frame. In the case of partially rimmed spectacles, the bearing edge of a spectacle lens is understood on the one hand to mean the edge of a spectacle lens corresponding to the inner edge of the spectacle frame and the lens outer edge not adjoining the spectacle lens frame. The bearing edge of a spectacle lens in the case of rimless spectacles is the lens outer edge.

To fit the spectacle lenses correctly into a spectacle frame, it is necessary on the one hand to determine so-called centering parameters, so that the optical centers of the lenses can be brought into alignment with the visual axes of the corresponding eyes, in order thus for example to acquire information concerning the pupil distance and information concerning the height of the pupils in relation to the spectacle frame. On the other hand, it is necessary to know the bearing edge of the spectacle lens defined by the spectacle frame, in which spectacle frame the spectacle lens is to be received.

Apart from information concerning the pupil distance and information concerning the height of the pupils in relation to the spectacle frame, the following variables in particular are included under the term centering parameter: monocular pupil distance PD, corneal vertex distance HS according to reference point requirement and/or according to ocular pivot point requirement, monocular centration distance, centering point coordinates, lens distance, decentration of the centering point, lens height and width, lens center distance, spectacle lenses angle $\alpha$, frame lens angle $\beta$, and fitting height.

The centering parameters are usually determined by an ophthalmic optician. Important centering parameters are defined for example in standard EN ISO 13666:2012 (D/E) and can be established by an optician and a subject standing or sitting opposite one another, wherein the subject puts on the frame of his choice with a spectacle lens received therein. The subject is asked to look into the distance, and the optician then draws on the lens or a ruled contact film, based on his visual judgement, a cross at the viewing reference point, which he has sighted from his visual reference opposite the subject. This cross (centering cross) then determines the position of the optical center-point of the spectacle lens to be used in the frame. This method is performed separately for each of the subject's eyes. The distance of the centering cross thus established is the pupil distance PD.

For the centering parameter determination, however, automated measurement systems are nowadays also used. Such a measurement system is described for example in WO 01/84222 A1. This system contains a digital video camera accommodated in a height-adjustable manner in a column, the objective lens whereof is arranged together with a mirror and a light source in the region of the front face of the housing. In particular, the system enables the measurement of distances and the capturing of dimensions, which have to be taken into account for the grinding-in of spectacle lenses. In this system, there is a computer connected to the digital video camera, which determines centering parameters for the spectacle frame by means of image evaluation from the image of a spectacle wearer with a spectacle frame and with a measuring bracket fixed to the spectacle frame.

For an ophthalmic optician who is advising end customers, it is important that the centering parameter determination can be carried out as easily, quickly, and reliably as possible. In order that the ophthalmic optician can provide the end customers with high-quality advice, workflows are therefore of interest that are inherently free from error and can be carried out quickly.

In D. Borza et al., "Eyeglasses Lens Contour Extraction from Facial Images Using an Efficient Shape Description," Sensors, vol. 13, no. 10, pages 13638 to 13658 (2013), a computer-implemented method of the type mentioned at the outset is described for the determination of the edge of spectacle lenses in a captured image of a spectacle wearer, wherein the number of points of the image points lying on the edge of the spectacle lenses is modelled as a superposition of mathematical functions based on the definition of so-called Fourier descriptors.

These mathematical functions describe different spectacle rim shapes. The functions used here for the modelling of the edge of spectacle lenses are stochastic, i.e., are selected according to a random principle from an infinite number of possible functions. The model for the edge of the spectacle lenses described on the basis of the selected functions is stochastic, i.e., selected according to a random principle from an infinite number of possible functions. The model for the edge of the spectacle lenses described on the basis of the selected functions is then compared with a spectacle lens edge established in an edge detection process and evaluated.

In C. Nieuwenhuis et al., "Spatially Varying Color Distributions for Interactive Multi-Label Segmentation, IEEE Transactions on Pattern Analysis and Machine Intelligence," IEEE Computer Society, USA, vol. 35, no. 5, pages 1234 to 1247 (2013), a method for the segmentation of different regions in digital images is described. Here, the color of image points in the digital images is evaluated. For this purpose, an operative manually marks on a computer different image regions which are to be segmented, for example with a computer mouse. The different image regions are then segmented by optimization of a cost function based on conditional probabilities. For this, the conditional probability that the image point lies in a specific image region is maximized for each image point in the images on the basis of the color information in respect of the manually marked image regions. At the same time, the segmented regions are intended to be as compact as possible.

A. Fernandez et al., "Glasses detection on real images based on robust alignment, Machine Vision and Applications," Springer Verlag, vol. 26, no. 4, pages 519 to 531 (2015), discloses a method for evaluating photographs of persons to identify whether the persons are spectacle wearers. This method detects unchanging facial features and calculates therefrom the region around the eyes. Within this region, a feature vector by means of which the person is classified as wearer of spectacles or non-wearer of spectacles is determined from the colors.

C. Wu et al., "Automatic Eyeglasses removal from Face Images," IEEE Transactions on Pattern Analysis and Machine Intelligence, IEEE Computer Society, USA, vol. 26, no. 3, pages 332 to 336 (2004) discloses a method which is used for removing spectacles and spectacle lenses from digital shots of people. The method learns from a database, in which people with and without spectacles are stored, how the eye region has to be altered to remove the spectacles from the face. Moreover, the contour of the frame can be detected by optimizing points on the edge of the frame and external parameters such as rotation, scaling and translation by means of a stochastic method.

DE 10 2011 115 239 A1 describes, in a digital image of a spectacle wearer, how to establish the contour of the edge of the spectacle lenses using a spectacle lens-specific tracer dataset, which contains the curve of the spectacle lens edge.

SUMMARY

It is an object of the disclosure to provide a precise representation of the edge of a spectacle lens which is to be received in a spectacle frame, e.g., to take account of this information in the determination of centering parameters, or in the centering of a left or right spectacle lens in a spectacle frame or in the grinding of a left or right spectacle lens into a spectacle frame, in particular in the production of a spectacle lens or in the production of spectacles.

This problem is solved by the computer-implemented methods for establishing the representation of the edge of a spectacle lens and the apparatuses for establishing the curve of the edge of a spectacle lens as disclosed herein.

The disclosure understands a cost function E(u), which is also referred to by those skilled in the art as a so-called objective function, energy function, loss function, utility function, or fitness function, to mean a mapping that maps any allocation of its arguments u onto a scalar value E(u) having the importance of costs or a scalar physical variable such as energy or distance.

Within the meaning of the disclosure, optimizing a cost function E(u) should be understood to mean selecting a best argument u of the cost function E(u) for which the cost function E(u) satisfies the target criterion that it assumes an at least locally extreme value, i.e., a value which is at least locally maximal or minimal.

The disclosure understands information data I(x) derived from image data b(x) to mean data concerning information which can be calculated from the image data b(x), for instance color models, edge images, color probability distributions, objects in images, such as, for instance, eyes, mirroring, axes of symmetry and visual lines. The calculation of information data I(x) from image data b(x) can be influenced in particular by calibration information concerning a camera that serves for capturing the image data b(x).

The disclosure understands a deterministic optimization method for optimizing a cost function to mean an optimization method which always leads to the same argument of the cost function even upon repetition using the same start value.

A cost function is deterministically optimizable if a deterministic algorithm exists which calculates a global or local optimum of the cost function, wherein the calculated argument of the cost function at the global or local optimum forms a usable solution of the optimization problem, i.e., a solution which corresponds to minimum quality requirements made of a solution of the optimization problem and can thus be used as a reasonable result obtained by optimizing the cost function.

In contrast to a stochastic optimization method, a deterministic optimization method is free of random influences and calculates each time the same solution given the same start value. A deterministic optimization method therefore always yields the same result upon repetition proceeding from the same start value. Unlike a stochastic optimization method, a deterministic optimization method thus leads to a solution more directly, reliably, and (depending on the size of the parameter space) often also more rapidly. They are efficient with regard to run time and/or memory requirement. Deterministic optimization methods are often suitable for real-time implementation on a graphics card.

By contrast, stochastic optimization methods usually require a long computation time and lead to a distribution of solution values when they are carried out repeatedly and with the same input, since random influences play a part. From this distribution it is ultimately necessary to select one element as the best, e.g., the expected value or the median of the distribution. This type of algorithms often does not satisfy the efficiency requirements of the problem posed in respect of run time and/or memory requirement.

It is important for an ophthalmic optician, when determining centering parameters, to have as rapid and error-free workflow as possible, to achieve high-quality advice, which focuses on the end customer and is not dominated by technical processes. In this connection, a mode of functioning as disruption-free as possible (robustness) of the automatic methods is required. This can be achieved with methods of digital image analysis and machine learning.

The inventors have recognized that, with methods of digital image analysis, it is possible to establish the edge of spectacle lenses matched to a predefined spectacle frame, not only with a high degree of accuracy, but also with a high degree of reliability in a very robust manner with regard to error influences.

According to the disclosure, the following steps are carried out to establish the representation of the edge of a spectacle lens or a left spectacle lens and a right spectacle lens for a spectacle wearer:

image data b(x) are provided relating to the spectacle wearer with a worn spectacle frame;

information data I(x) derived from image data b(x) are calculated; and a deterministically optimizable cost function E(u) linking the information data I(x) with spectacle lens data u(x) is calculated, wherein the spectacle lens data u(x) describe the spatial extent of at least one spectacle lens held in the spectacle frame, and the curve of an edge of the spectacle lens or of the left spectacle lens and the right spectacle lens is then set by optimizing the cost function E(u).

The cost function E(u) can contain at least one model learnt from data by machine learning. In particular, the curve of an edge of the spectacle lens or of the left spectacle lens and the right spectacle lens can be set by deterministically optimizing the cost function.

According to the disclosure, the cost function E(u) can be a sum of weighted energy terms. Due to the fact that the cost function E(u) is optimized with the constraint that deviations from a color model or a spectacle lens model are penalized and mirroring at a spectacle lens or a spectacle frame are taken into account, a high degree of accuracy for a representation of the edge of a spectacle lens matched to a spectacle frame can be achieved. Constraints in the optimization of the cost function can also be 2-D or 3-D symmetry conditions imposed on a representation of the edge of a spectacle lens. It is advantageous if the optimization of the cost function E(u) takes place only within a region of interest, which is set by the detected facial features.

It should be noted that the cost function E(u) can be minimized in a plurality of ways within the scope of the disclosure, e.g., by continuous methods (primal-dual approaches), graph-theoretical methods, discrete graph-cut methods, active contour models, gradient descent methods, simplex methods, or suchlike. Continuous methods are defined by the fact that they describe the image as a continuous function and the cost function is thus defined on a continuous mathematical space. The discretization of the cost function on the basis of image points in image data u(x) (pixel basis) typically does not take place until a last step before the optimization. In contrast with this, so-called discrete optimization methods define the optimization function directly on the plane of image points (pixel plane) in the form of a graph. Continuous methods have the advantage over discrete methods that they avoid artefacts at edges and can be parallelized much more easily, which enables rapid calculations on a graphics card.

The calculated information data I(x) derived from the image data b(x) can comprise an edge information image g(x) that is established from the captured image data b(x) by means of an edge detection algorithm. It is thus possible to identify spectacle frames in an image of the face of a spectacle wearer. The edge detection algorithm can for example contain an edge detector. Such an edge detector makes it possible to detect in the image data b(x) image points which correspond to light-sensitive pixels in the image plane of the image sensor of an image capture device and which lie on edges of the spectacle frame. For every image point, a value representing the probability of an edge that belongs to the spectacle edge is thus specified. The edge detector can also be a so-called general edge detector, which detects any kind of image edge, or it can have been trained specially for spectacle edges by means of machine learning methods. It is thus possible for example to distinguish between spectacle frame edges and non-spectacle frame edges or between an outer spectacle frame edge and the inner spectacle frame edge.

The edge detector in the edge detection algorithm can in particular be an edge detector from the group of gradient, color gradient, Canny edge detector, directed filter, or Solbel filter. It is possible for the edge detection algorithm to access a filter databank with a number of filters, such as for example Gabor filters or learnt filters, for the purpose of edge detection. It is also advantageous if the edge detection algorithm is embodied as a self-learning algorithm.

The inventors have found that, with the aid of so-called machine learning, it is possible for the determination of the edge of a spectacle lens, which is matched to a spectacle frame, to be guaranteed not only with a high degree of accuracy but also with great reliability, in a way that is very robust with regard to error influences.

An idea of the disclosure is that the calculated information data I(x) derived from the image data b(x) comprise a color information image f(x) that is established from the captured image data b(x) by means of a color evaluation algorithm that evaluates the color of image data b(x). The cost function E(u) can in particular be a weighted sum of an edge detection cost term $E_{edge}(u)$ and a color evaluation cost term $E_{color}(u)$.

Such a color evaluation algorithm serves to distinguish image points which correspond to points lying on a spectacle lens from image points which correspond to points lying on the spectacle frame or points lying in the background of the spectacle frame. For this purpose, the color evaluation algorithm can use a color model, e.g., a skin color model, which separates image points which correspond to points on the face of the spectacle wearer from image points which correspond to points lying on the spectacle frame. It is also advantageous to smooth the image markedly with a low-pass filter in the algorithm to obtain an approximation to the face of the spectacle wearer without a spectacle frame. This approximation can then form a color model for image points lying within the spectacle lens. To obtain an approximation to the face of the spectacle wearer without a spectacle frame, it is also possible for the algorithm to contain a routine for machine learning on the basis of exemplary data in respect of persons without a spectacle frame or a routine which generates a dataset from the image data b(x) in respect of the spectacle wearer with the spectacle frame by means of so-called Principal Component Analysis learnt on the basis of a multiplicity of images having faces without spectacles, which dataset corresponds to an image of the face of the spectacle wearer or an image of a portion of the face of the spectacle wearer without the spectacle frame.

In the context of the color evaluation algorithm, a change in the color space from the RGB color space into a color space which separates brightness and color, e.g., a change into the YCbCr or the HSV color space, can also be provided. This measure makes it possible to work relatively independently of lighting. It should be noted that, within the scope of the disclosure, a color space can also be learnt from a multiplicity of image data b(x) corresponding to a plurality of images. Moreover, it should be noted that, within the scope of the disclosure, provision can be made to define a suitable skin color space on the basis of known skin color points in image data b(x), e.g., with the aid of image points which correspond to points on a bridge of the nose. With the color evaluation algorithm with such a color model, provision is then advantageously made to evaluate the information of the distance of image points in the captured image data from the eyes of the spectacle wearer, to take account of the fact that image points, which lie close to the eyes of the spectacle wearer, lie with a higher probability in the region of spectacle lenses received in the spectacle frame than image points in the image data b(x), which have a great distance from the eyes of the spectacle wearer. For this purpose, a distance function routine can for example be provided in the color evaluation algorithm, which distance function routine calculates for each image point, i.e., each pixel of an image sensor of an image capture device, the shortest distance to an image point, i.e., a pixel of the corresponding image sensor, which lies on the eyes of the spectacle wearer. The greater this established shortest distance, the higher the costs that will then be applied in the color term of the cost function since an association of the pixel with the lens region or with the lens edge becomes less probable.

An exemplary embodiment of the disclosure makes provision such that a convex function is selected as a cost function E(u) to find the sought spectacle lens data u(x).

A convex function is understood in the present case, as in the analysis, to mean a real-valued function, the graph whereof lies below each connection segment of two of its points. This is equivalent to saying that the epigraph of the function, i.e., the set of points above the graph, forms a so-called convex set.

The convexity of the cost function E(u) is achieved by the disclosure in particular by the fact that the latter is a sum of convex cost function terms. For example, the cost function can be formed from a convex color cost term $E_{color}(u(x))$, which correlates the color of the image data b(x) with spectacle lens data u(x) and evaluates the color by means of a color model, and a convex edge cost term $E_{edge}(u(x))$, which is a correlation of image edges in the image data b(x) with the spectacle lens data u(x) or with the edge 26 of a spectacle lens 28 or two spectacle lenses 28, 29 represented by a derivative of spectacle lens data b(x).

The convexity of the cost function is accompanied by three major advantages: Generally, functions have global or local optima. Optimization methods thus normally only guarantee finding a local optimum, not the global optimum. In the case of convex functions, on the other hand, it is the global optimum that is always found, since no local optima exist. In the case of convex cost functions, an arbitrary start value (e.g., u(x)=0=no spectacle lens present) can be used, since the method always converges into a global optimum. A convex cost function is therefore deterministically optimizable. In particular, a convex cost function is globally optimizable by means of simple deterministic algorithms such as e.g., gradient descent algorithms. By contrast, nonconvex functions need a good start value which lies close to a global optimum to obtain usable, good solutions of the optimization problem as results of a deterministic algorithm.

It is advantageous if the calculation of information data I(x) derived from the image data comprises establishing mirroring information data s(x) using an algorithm for identifying mirroring at the spectacle frame and/or at a spectacle lens received in the spectacle frame. It is advantageous here if this algorithm is designed such that mirroring at a spectacle lens can be distinguished from mirroring at the spectacle frame. This can be done e.g., by detecting particularly bright regions in the image with subsequent analysis of the shape of the detected mirroring regions. In this way, the accuracy of the established representation of the edge of a spectacle lens can also be increased. It is also advantageous for the accuracy of the method if the color evaluation algorithm and the edge detector take account of the mirroring information data s(x) calculated from the image data b(x), since mirroring in an image can have marked interfering edges, which can easily be confused with the lens edge.

The calculation of information data I(x) derived from the image data b(x) can comprise establishing facial feature information data m(x) with an algorithm for identifying facial features.

It is also an idea of the disclosure that the algorithm is configured to identify one or more facial features from the group of eye, pupil, eyebrow, nose, mouth, or facial contour. In particular, it is possible for the color evaluation algorithm and/or the edge detection algorithm to take account of the facial feature information data m(x) calculated from the image data b(x). Because the eyes and eyebrows of a spectacle wearer can also give rise to edges in the images based on captured image data b(x) which interfere with the determination of the edge of spectacle lenses, it is advantageous if the edge detection algorithm also takes account of edges caused by the eyes or eyebrows of the spectacle wearer in images based on captured image data b(x), whereby facial feature information data m(x) calculated from the image data b(x) are evaluated.

To determine the face and the so-called region of interest, in which the spectacle frame, i.e., where the spectacles are located in the image, the detection of facial features can be helpful. In this case, facial features are for example one or more features from the group of eyes, position of the pupils, eyebrows, nose, mouth, and/or facial contour of a face. On the basis of one or more features, it is possible to calculate in which region the spectacle edges are being sought. With the eyes, moreover, points are known which lie in any event within the lens.

For the calculation of information data I(x) derived from the image data b(x), establishing spectacle lens form information data di(x) can be provided with an algorithm which, on the basis of a spectacle lens model supplied to the algorithm or on the basis of a multiplicity of spectacle lens forms supplied to the algorithm, specifies a parametric model or a map representing probabilities about the probability that captured image data lie on a spectacle lens as spectacle lens form information data di(x). In particular, provision can be made that the calculation of information data I(x) derived from the image data comprises establishing spectacle lens form information data di(x) using an algorithm which, on the basis of a spectacle lens model supplied to the algorithm or on the basis of a multiplicity of spectacle lens forms supplied to the algorithm, specifies a 2-D form or a 3-D form of a spectacle lens is receivable in the spectacle frame as spectacle lens form information data di(x).

An idea of the disclosure is, for example, to determine a model for the form of a spectacle lens on the basis of examples of spectacle lenses pre-segmented manually. Such a model can be a probability map, which indicates for each image point in captured image data b(x) how likely it is that the point corresponding to this image point lies within the spectacle lens. In this case, it is advantageous to center the segmented examples on the basis of the eye position and to align them along the principal axes or other axes. It is, however, also possible to estimate the form of the spectacle lenses in parametric models, e.g., from the spectacle lens as an area in the image view or from the points corresponding to a spectacle lens contour. The parameters of these models can then be optimized. Moreover, it should be noted that a model can also be used as an auxiliary condition in the optimization, e.g., as an auxiliary condition that the final contour lies within the previously learnt model space, or by the deviation of the contour from the closest element within the feature space being penalized by means of additional costs in the cost function. It goes without saying that, instead of learning models from examples, corresponding models can also be defined within the scope of the disclosure, e.g., models which are based on so-called tracer data, for example in the form of 3-D coordinates or in the form of 2-D coordinates, which are provided by means of a tracer device tracing the curve of the frame inner edges in a spectacle frame.

It is advantageous if the color evaluation algorithm takes account of the spectacle lens form information data di(x) calculated from the image data b(x). The calculated information data I(x) derived from the image data b(x) can also comprise a bridge center M established by means of a bridge center detection algorithm. Moreover, it is possible for images recorded from at least two different directions of view to form the basis of the provided image data b(x) in relation to the spectacle wearer with or without associated calibration information.

The calculated information data I(x) derived from the image data b(x) can also comprise depth map data t(x) established by means of a triangulation algorithm from the image data b(x) or from the segmented spectacle lens data u(x). It is advantageous if the cost function E(u) is taken into account in a cost function term as a constraint that a left and a right spectacle lens received in a spectacle frame are symmetrical to one another. This can take place for example by the fact that the cost function evaluates points in spectacle lens data u(x) imaged onto one another with a stereo condition in respect of images that correspond to different recording directions of the image capture devices, e.g., in that a 3-D point in the face of the spectacle wearer, i.e., a point with depth information, is imaged in a plurality of images, so that corresponding points in images based on the image data b(x) are assigned in each image either to a spectacle lens (u(x)=1) or a background (u(x)=0) lying behind a spectacle lens, or in each image to the spectacle rim.

It should be noted that the cost function for finding sought spectacle lens data u(x) can also contain a symmetry cost term $E_{sym}$ (u(x)), which correlates symmetries contained in the image data b(x) with spectacle lens data u(x).

An idea of the disclosure is to use for this purpose the information of the bridge center M of a spectacle frame, to define a 3-D mirror plane for the spectacle lenses. In the case of frontal shots, the bridge center M also makes it possible to match spectacle lens data u(x) for a left and a right spectacle lens to one another and to formulate a symmetry constraint for the matching. The bridge center M can also be estimated, whereby the center of the left and right inner lens edge of spectacle lenses is calculated.

Initially, the bridge center M can be determined for example with the aid of the center points between the detected pupil centers, the position of the bridge of the nose or a weighted combination of the two features.

If only a frontal shot is present without further shots or additional 3D information, a symmetry constraint in the 2-D plane can nevertheless be formulated. For this purpose, a mirror axis can be estimated, e.g., as bridge center, as mid-perpendicular between the two eyes of the spectacle wearer or as center line between the inner edges of the two rectangles or parallelograms of an initial or intermediate solution that circumscribe the lens edges. The center line can also be adapted during the optimization. The best possible mapping of the mirrored right or left spectacle lens onto the respective other spectacle lens can then be calculated by means of a matching method. A penalty term can then be calculated from the deviation of the lens surfaces or lens contours mapped onto one another. A penalty term is a term which induces additional costs in the cost function, in this case for non-symmetrical solutions.

If the subject is not situated completely centrally in front of the camera, the frontal shot can result in perspective distortions in the image and thus in non-symmetrical representations of the two lenses in the image. However, the symmetry condition can nevertheless be used as an approximation, in this case typically with a smaller weighting factor.

Alternatively, it is also possible, if only a frontal shot is present, to assume a specific depth and/or shape and/or curvature of the lenses in space to obtain 3-D information for a symmetry condition in this way.

In that image data b(x) are captured with image capture devices, which capture the face of the spectacle wearer with a spectacle frame worn by the latter from different viewing angles and in that calibration information is known in respect of these image capture devices, it is possible to calculate, by triangulation with respect to the face of the subject with the spectacle frame, the aforementioned depth map t(x) in the form of a point cloud. From this point cloud, it is then possible to estimate the form of 3-D spectacle lenses, for example as planes in an approximation to the true contour of the spectacle lenses. From these planes, it is then possible, by means of a mirror plane constraint (or a penalty term) which is imposed on the cost function, to ensure symmetry of the spectacle frame in three dimensions. Within the scope of the disclosure, this 3-D information can then also be used to calculate centering parameters.

An algorithm according to the disclosure for calculating the edge of spectacle lenses, i.e., the spectacle contour, by minimization of a cost function with an optimization routine can thus contain one or more routines from the group of edge detection routine, color evaluation routine, mirroring routine, spectacle lens position routine, triangulation routine, bridge center identifying routine, facial feature identifying routine, or routine for estimating the 3-D curve of spectacle lenses.

It should be noted that the cost function E(u) linking the information data I(x) with spectacle lens data u(x) can contain at least one model learnt from data by machine learning.

A model learnt from data by machine learning should be understood here to mean a mapping whose parameters have been automatically learnt or adapted by means of a machine learning algorithm on the basis of a set of example data such that the mapping describes the example data (training data) as well as possible and also generalizes to new examples (validation data).

The disclosure also extends to a computer program stored on a non-transitory storage medium and having program code that, when loaded into, and executed on, a computer system, is configured to carry out a method of establishing a representation of an edge of a spectacle lens.

An apparatus according to the disclosure for establishing the curve of the edge of a spectacle lens for a spectacle wearer contains at least one image capture device for providing image data b(x) relating to the spectacle wearer with a worn spectacle frame and has means for calculating information data I(x) derived from the image data b(x), means for calculating a cost function E(u) linking the information data I(x) with spectacle lens data u(x), wherein the spectacle lens data u(x) describe the spatial extent of at least one spectacle lens held in the spectacle frame, and means for setting a curve of an edge of the spectacle lens by optimizing the cost function E(u).

The disclosure additionally extends to a method for centering a left spectacle lens and/or a right spectacle lens in a spectacle frame.

To fit the spectacle lenses correctly in a spectacle frame, it is necessary to center the spectacle lenses, that is to say that the optical centers of the lenses have to be brought into alignment with the visual axes of the eyes of the spectacle wearer in order that the spectacle lenses mediate the best possible vision for the vision of the spectacle wearer.

For centering the spectacle lenses it is necessary to know centering parameters, e.g., the information about the pupillary distance and the information about the height of the pupils in relation to the spectacle frame. Furthermore, for centering spectacle lenses it is important to know the height of the optical centers of the spectacle lenses at a ratio in relation to the lower or upper edge of the spectacle frame into which the spectacle lenses are inserted.

In the method according to the disclosure for centering a left spectacle lens and/or a right spectacle lens in a spectacle frame, a step (i) involves determining centering parameters with respect to the spectacle lens, wherein determining the centering parameters comprises establishing the representation of the edge of the spectacle lens as specified above, and a further step (ii) involves centering the spectacle lens in the spectacle frame using the centering parameters determined in the preceding step (i).

Furthermore, the disclosure extends to a method of grinding a left spectacle lens or a right spectacle lens into a spectacle frame, wherein a step (i) involves determining centering parameters, wherein determining the centering parameters comprises establishing the representation of the edge of the spectacle lens by a method specified above, and wherein a further step (ii) involves grinding the spectacle lens in for an arrangement in the spectacle frame on the basis of the centering parameters determined in the preceding step (i).

Moreover, the disclosure also extends to a method for producing a left spectacle lens or a right spectacle lens, wherein use is made of a method step of grinding the spectacle lens into a spectacle frame according to a method specified above.

The disclosure also extends to a method for producing spectacles, wherein use is made of one or more of the methods specified above.

BRIEF DESCRIPTION OF THE DRAWINGS

The disclosure will now be described with reference to the drawings wherein.

DESCRIPTION OF EXEMPLARY EMBODIMENTS

Figure 1:
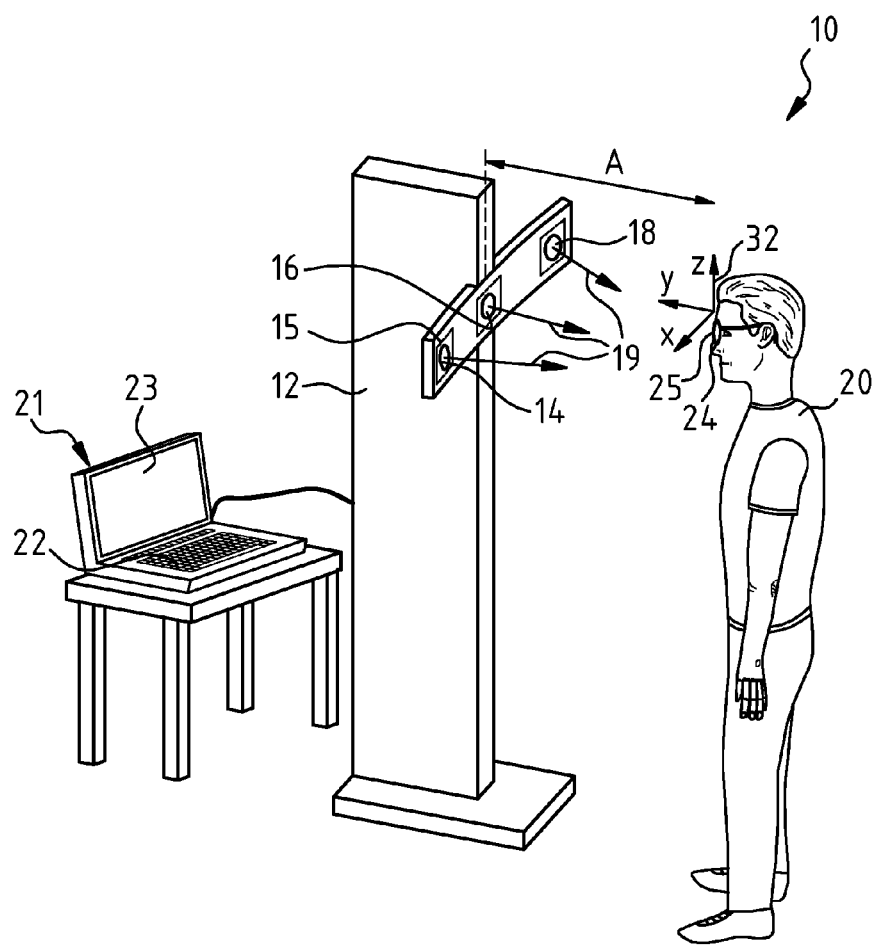
FIG. 1 shows a device for establishing a representation of the edge of the two spectacle lenses in a spectacle frame.

Device 10 shown in FIG. 1 is a camera-based centering system and enables the determination of a representation of the edge of the two spectacle lenses in a spectacle frame. Device 10 has a column 12, which carries image capture devices 14, 16, 18 referenced relative to one another with image sensors 15 for the capture of image data of a spectacle wearer 20. It contains a computer unit 21 connected to image capture devices 14, 16, 18 with a keyboard as an input interface 22 and an output interface 23 in the form of a monitor.

For the detection of image data with image capture devices 14, 16, 18, spectacle wearer 20 positions himself for example in a specialist optician's shop with a selected spectacle frame 24 at a recording distance A≈30 cm from column 12. By means of image capture devices 14, 16, 18, face 25 of spectacle wearer 20 can be captured in different recording directions 19.

Device 10 enables the determination of a representation of the edge of the spectacle lenses, which are intended to be received and held in a spectacle frame 24 selected by spectacle wearer 20, to correct their faulty vision and to compensate for it as far as possible. For this purpose, an image dataset b(x) is recorded by means of image capture devices 14, 16, 18, which dataset shows face 25 of spectacle wearer 20 with spectacle frame 24 placed on. To establish the sought representation of the edge of the spectacle lenses matched to spectacle frame 24, image dataset b(x) can be recorded without spectacle frame 24 worn by spectacle wearer 20 containing spectacle lenses. It is however also possible to record a corresponding image dataset b(x) when spectacle wearer 20 is wearing a spectacle frame 24, in which support lenses or spectacle lenses are mounted.

Figure 2:
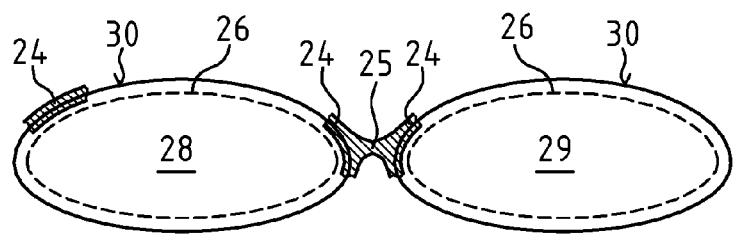
FIG. 2 shows a representation of the edge of a left and a right spectacle lens matched to the spectacle frame.

FIG. 2 shows a left spectacle lens 28 and a right spectacle lens 29 with the section of a spectacle frame 24 which holds spectacle lens 28. Edge 26 of spectacle lens 28 is understood in the present case to mean the bearing edge of a spectacle lens defined in standard DIN EN ISO 13666:2013-10, section 13.4. The bearing edge surrounds and limits the lenticular part of a spectacle lens, i.e., the part which has the predefined dioptric effect of spectacle lens 28, 29 according to the definition in section 13.2 of standard DIN EN ISO 13666:2013-10. The bearing edge of a spectacle lens can, in the case of rimless spectacles, coincide with the edge of lateral face 30 of a spectacle lens 28, 29 facing away from spectacle wearer 20, the so-called lens outer edge. The lens outer edge is partially concealed in spectacle frame 24 worn by spectacle wearer 20.

As a representation of edge 26 of a spectacle lens 28 matched to spectacle frame 24, device 10 establishes as a dataset a number of points lying in the image plane of image sensor 15 of image capture device 16, which number of points describes the projection of bearing edge 26 of spectacle lens 28 in this image plane.

The precise knowledge of the curve of edge 26 of a spectacle lens 28 matched to a spectacle frame 24 enables a precise determination of the so-called centering parameters by taking account of further variables describing spectacle lens 28 and the eyes.

Figure 3A:
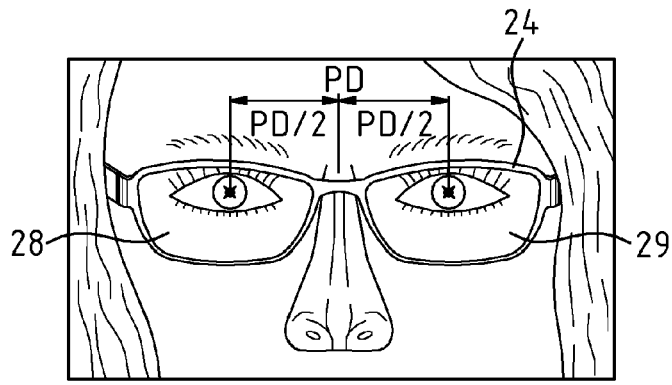
FIG. 3A shows the centering parameter pupil distance PD.
Figure 3B:
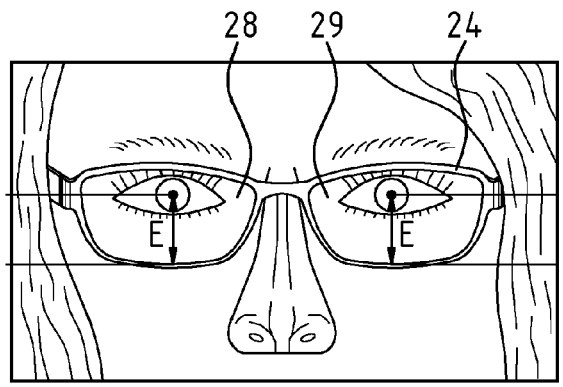
FIG. 3B shows the centering parameter grinding height.
Figure 3C:
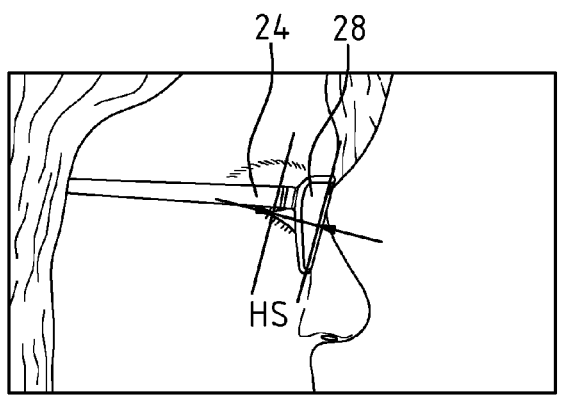
FIG. 3C shows the centering parameter corneal vertex distance HS.
Figure 3D:
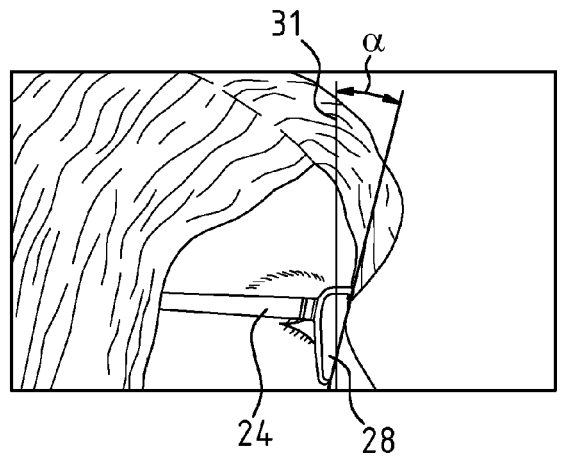
FIG. 3D shows the centering parameter tilt angle α.
Figure 3E:
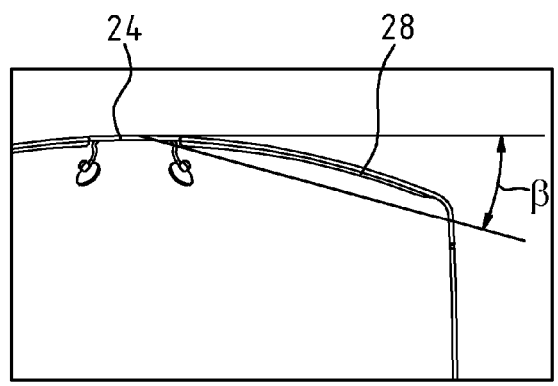
FIG. 3E shows the centering parameter frame lens angle β.
Figure 3F:
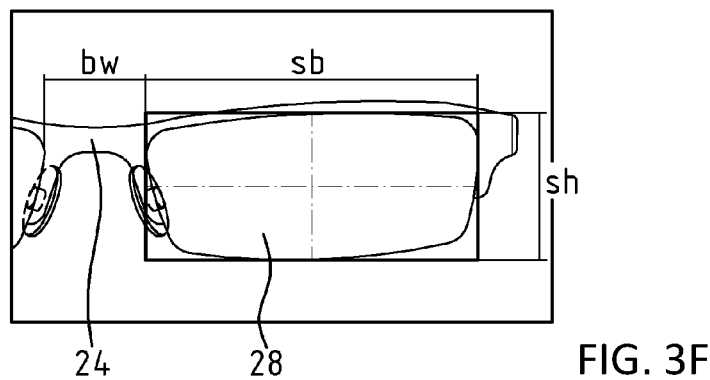
FIG. 3F shows the centering parameter box dimension.

FIG. 3A shows the centering parameter of pupil distance PD for spectacle lenses 28 in a spectacle frame 24, which a spectacle wearer 20 is wearing. In FIG. 3B, grinding height E is to be seen as a further centering parameter. FIG. 3C shows the centering parameter of corneal vertex distance HS. FIG. 3D shows as a centering parameter tilt angle α related to vertical 31. FIG. 3E shows as a centering parameter frame lens angle β, i.e., the angle between the frame plane and the left and right lens plane and FIG. 3F shows the box dimension centering parameters, i.e., the lens width sb, the lens height sh and the distance bw between spectacle lenses 28 in a spectacle frame 24.

Computer unit 21 in device 10 contains a computer program, which automatically establishes a representation of edge 26 of spectacle lenses 28 received into spectacle frame 24 from image data b(x) provided by means of image capture devices 14, 16, 18. This computer program makes it possible for features such as the pupil centers and frame edge to be automatically detected on the basis of provided image data b(x) and for their position to be able to be determined with sub-pixel accuracy in a coordinate system 32 referenced to spectacle frame 24. The computer program also establishes, by triangulation, positions of the image planes of image sensors 15 of image capture devices 14, 16, 18, referenced to coordinate system 32 of spectacle frame 24.

With the aid of FIG. 4, algorithm 34 converted in the latter for establishing the representation of edge 26 of a spectacle lens 28 is described below.

Figure 4:
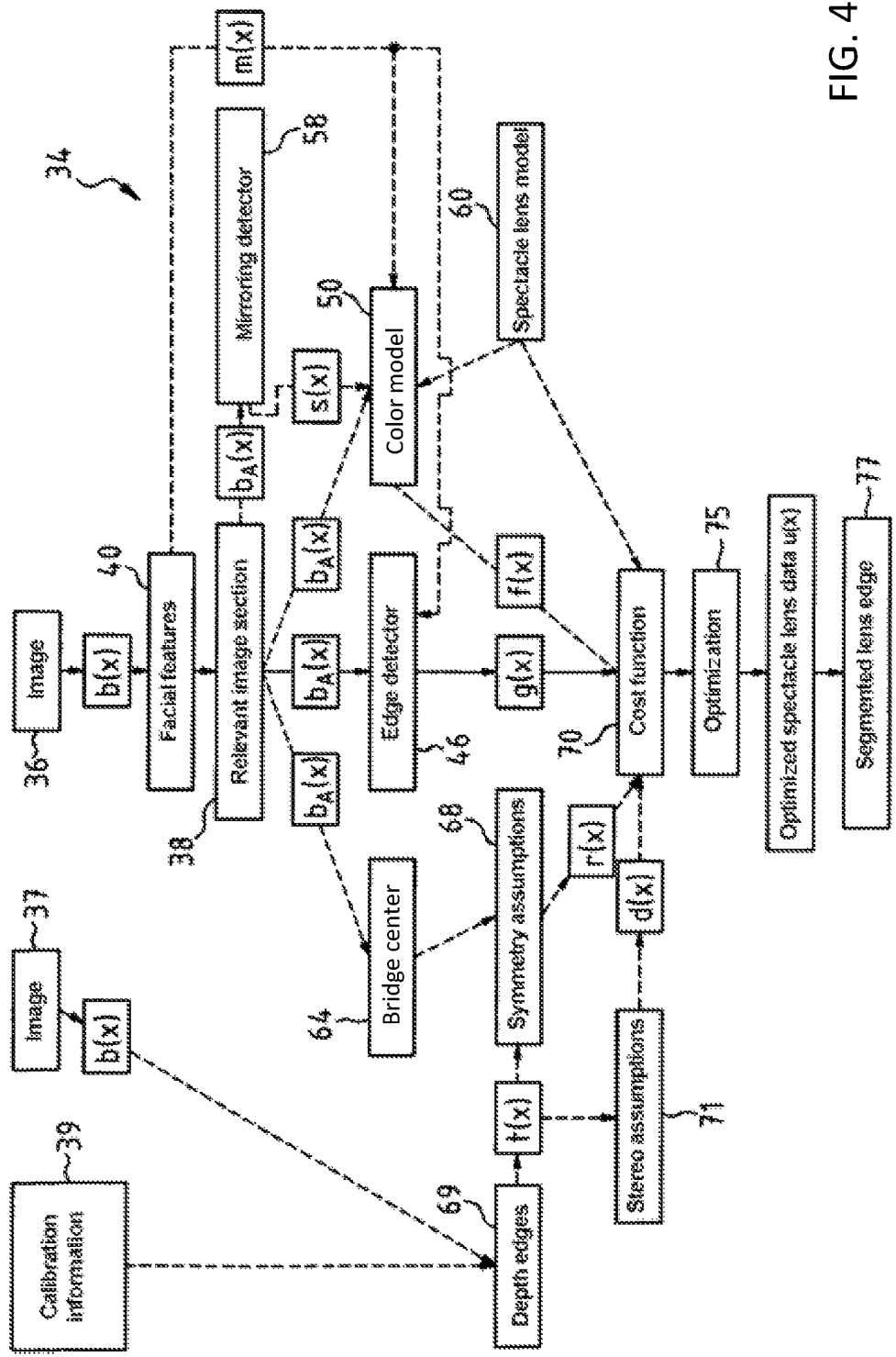
FIG. 4 shows an algorithm of a computer program for establishing a representation of the edge of the spectacle lenses received in a spectacle frame.
Figure 5:
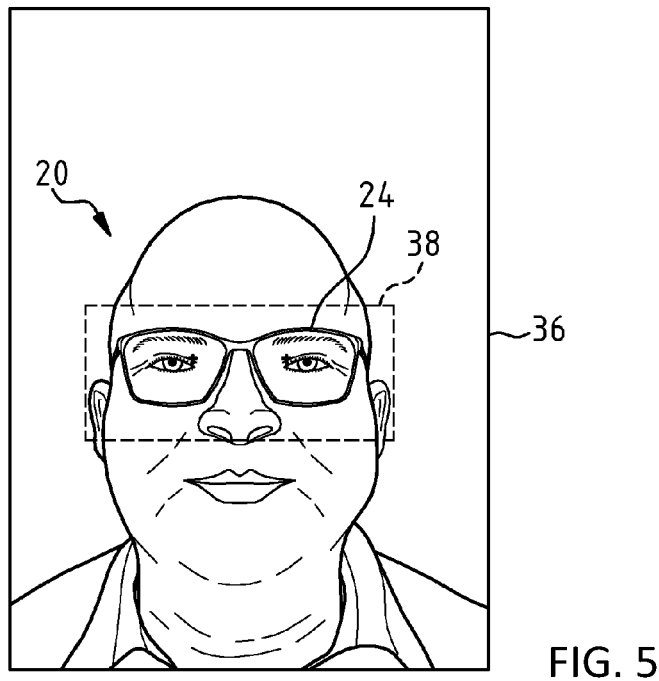
FIG. 5 shows image data in respect of a spectacle wearer with a spectacle frame.

In a first step, algorithm 34 determines a relevant image section 38 from image data b(x), provided by image capture device 16, of an image 36 shown in FIG. 5 of spectacle wearer 20 with a spectacle frame 24, as is shown in FIG. 4.

Figure 6:
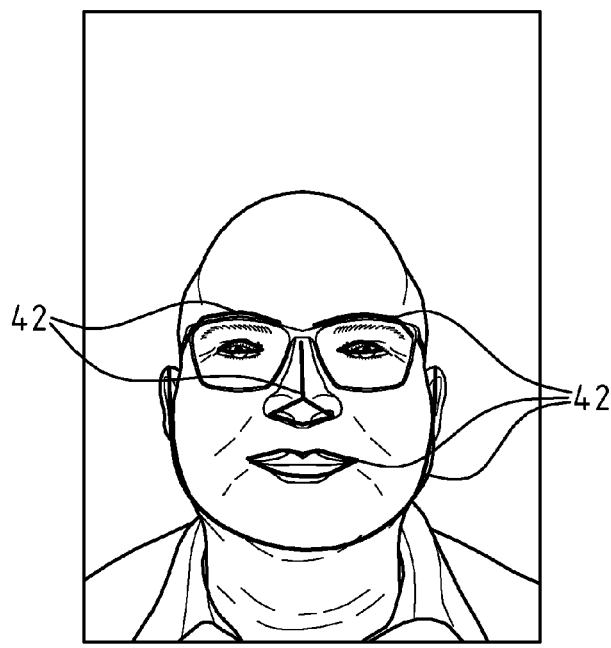
FIG. 6 shows facial features of a spectacle wearer with a spectacle frame.

To determine relevant image section 38, image data b(x) are processed in a facial feature identifying routine 40. The facial feature identifying routine 40 establishes from image data b(x) the position of the nose area, the eyes, the chin area, and the lip area by a comparison with data samples 42, which are shown in FIG. 6 and are characteristic of corresponding recordings of the face of a spectacle wearer 20 with a worn spectacle frame 24.

On the basis of a facial feature or a plurality of facial features of spectacle wearer 20, it is possible to calculate the region in which the edges of spectacle frame 24 of a spectacle frame worn by a spectacle wearer 20 normally lie. It should be noted that for example image points corresponding to the eyes of spectacle wearer 20 are image points lying on a spectacle lens 28.

Figure 7:
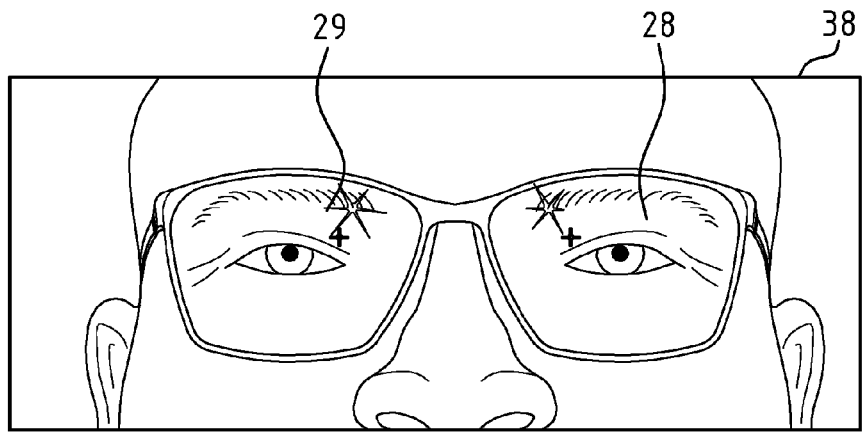
FIG. 7 shows selected image data in respect of a spectacle wearer with a spectacle frame.
Figure 8:
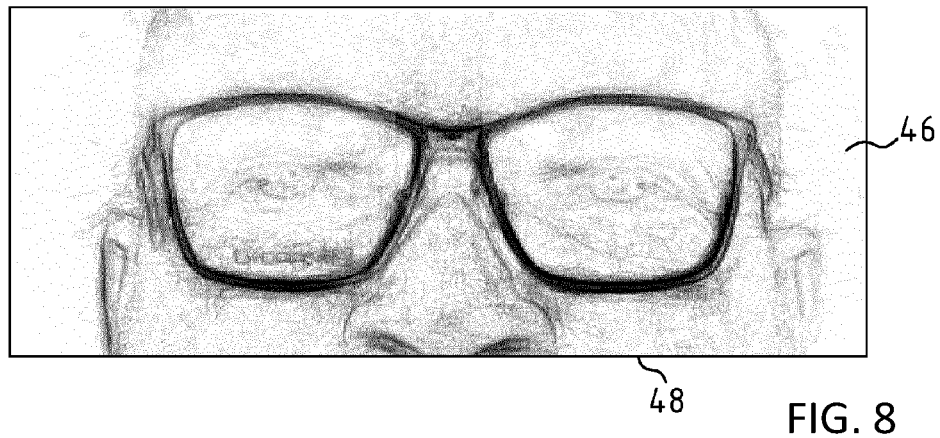
FIG. 8 shows an edge information image.

FIG. 7 shows, by means of facial feature identifying routine 40, sectional image data $b_A(x)$ established from image data b(x) in the sought image section 38 with spectacle frame 24. In algorithm 34, an edge information image g(x) with edge information data 46 is then calculated from sectional image data $b_A(x)$ in an edge detection routine 44 with an edge detection algorithm. FIG. 8 shows edge information image g(x) with edge information data 46 as image points in a gray-scale image 48.

In algorithm 34, moreover, a color information image f(x) is calculated from image data b(x) in a color evaluation routine 50 by means of a color evaluation algorithm.

Color evaluation algorithm f(x) is used to differentiate between image points in image regions in which a spectacle lens 28 lies and image points which lie in the image regions corresponding to spectacle frame 24. The color evaluation algorithm uses for this purpose a color model, e.g., a skin color model, by means of which image points in face 25 of spectacle wearer 20 can be separated from image points lying on a spectacle frame 24. The color evaluation algorithm contains a low-pass filter routine, by means of which image data b(x) captured with one or more image capture devices 14, 16, 18 are smoothed, in order thus to obtain data which correspond to an approximate representation of face 25 of spectacle wearer 20 without spectacle frame 24 worn by him. The data of this approximate representation are then used as a color model for the image points lying within a spectacle lens 28. In color evaluation algorithm f(x), a color spatial change from the RGB color space into the YCbCr color space or the HSV color space can for example also take place, in order thus to separate the information of the brightness of image points from the information of the color of the image points. It should also be noted that the color evaluation algorithm can also make it possible for a suitable color space to be learnt from a multiplicity of images or for a color space, e.g., a skin color space on the basis of determined image points in the image of a spectacle wearer 20 captured by means of an image capture device 14, 16, 18 to be learnt, for example on the basis of image points which correspond to points lying on the bridge of the nose in face 25 of spectacle wearer 20. Distance information can also influence the color model. The further away from the subject's eyes a pixel is, the less likely it belongs to the spectacle lens region or to the lens edge.

Figure 9:
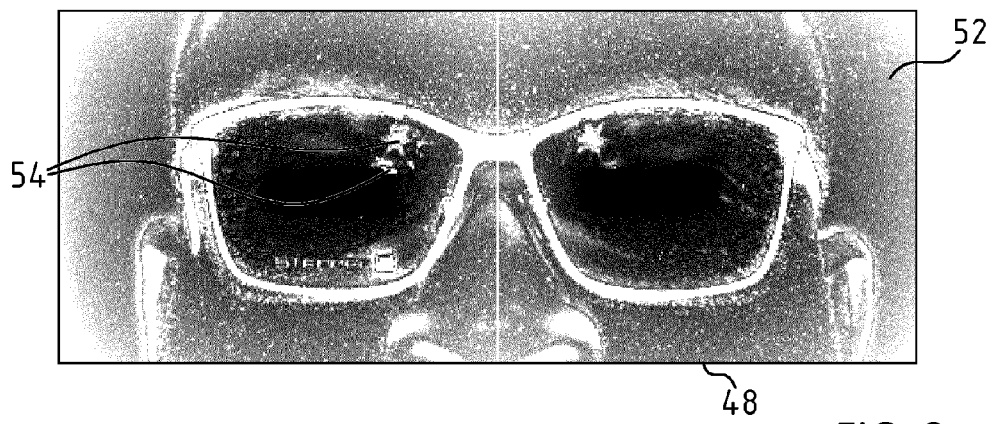
FIG. 9 shows a color information image.

FIG. 9 shows color information data 52 established in the context of the color evaluation algorithm as image points in a further gray-scale image 48. Mirroring or reflections 54, which can be seen on spectacle lenses 28 and/or spectacle frame 24, produce distinct edges which can easily be confused with the edge of the spectacles. Image points in respect of mirroring or reflections, moreover, have colors which are different from the skin color of spectacle wearer 20 and from the color of many spectacle frames 24.

To identify image points in image data b(x), which on the one hand are due to mirroring and reflections of light at spectacle frame 24 and on the other hand to mirroring and reflections of light at spectacle lenses 28, there is a mirroring detection routine 58 in algorithm 34. Mirroring detection routine 58 identifies in image data b(x) image points, the brightness of which lies above a threshold value and makes this information available in the form of mirroring information data s(x).

Alternatively or additionally, it is however also possible for the identification of corresponding mirroring and reflections of light to transform image data b(x) into another color space, e.g., the CMYK color space, and then to set in the latter suitable threshold values for the three color channels, in the event of the exceeding whereof an image point is qualified as an image point lying in a mirroring or a reflection. In order to identify image points in image data b(x), which on the one hand are due to mirroring and reflections of light at spectacle frame 24, it is moreover possible to evaluate the form of mirroring and reflections of light at spectacle lenses 28 and spectacle frame 24. Thus, for example, mirroring on the spectacle frame usually has an elongated form. In the mirroring routine, for the identification of mirroring and reflections on the basis of the form use can thus also be made of form factors or a ratio of the main axis lengths of an ellipse which can be inscribed into a number of image points corresponding to reflection or mirroring. It should be noted that, for the identification of corresponding mirroring and reflections of light in image data b(x), distances from first image points to second image points can advantageously also be evaluated, which correspond to points which lie on the eyes of the spectacle wearer.

Figure 10:
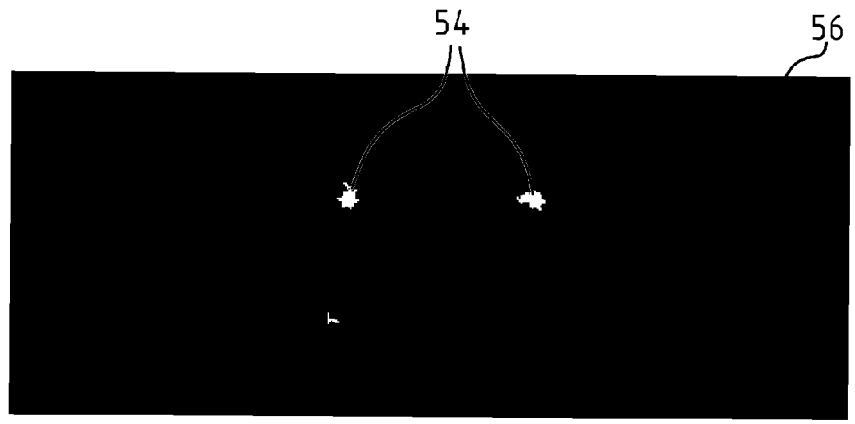
FIG. 10 shows an information image in respect of first mirroring.
Figure 11:
FIG. 11 shows an information image in respect of second mirroring.

FIG. 10 shows the image points from image data b(x), which are established by mirroring detection routine 58 and which lie with a reflection 54 or a mirroring on spectacle lenses 28, in a black-white image 56. FIG. 11 shows the image points from image data b(x), which are established by means of mirroring detection routine 58 and which lie with a reflection 54 or a mirroring on spectacle frame 24, shown in a black-white image 56.

To simplify the identification of image points in image data b(x), which lie on spectacle lenses 28 received in a spectacle frame 24, algorithm 34 contains a spectacle lens position routine 60.

Figure 12:
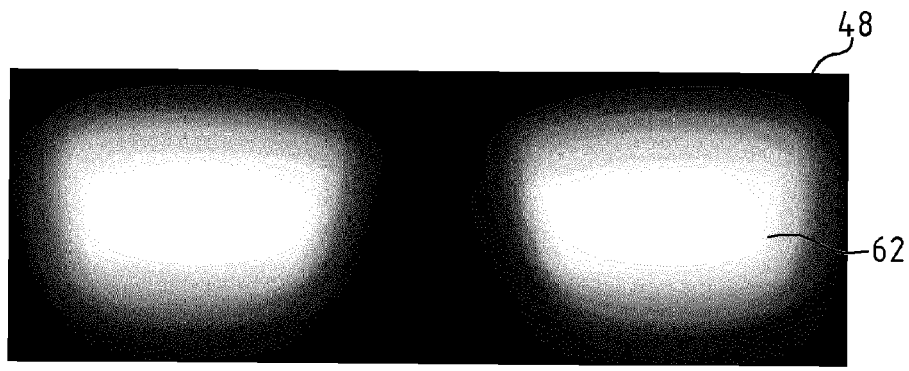
FIG. 12 shows a lens model probability map.

Spectacle lens position routine 60 establishes, on the basis of a multiplicity of spectacle lens information data in the form of spectacle lens models, a probability map as to the probability that captured image data lie on a spectacle lens 28, 29. FIG. 12 shows the probability values w(x) of the probability map as probability information data 62 in a gray-scale image 48.

It should be noted that, as an alternative to this, parametric models of the form of spectacle lenses 28 can also be estimated, e.g., on the basis of information contained in image data b(x) concerning the areas of spectacle lenses 28 or from information contained in image data b(x) concerning image points lying on the contour of spectacle lenses 28. The parameters of these models can then be optimized.

Figure 13:
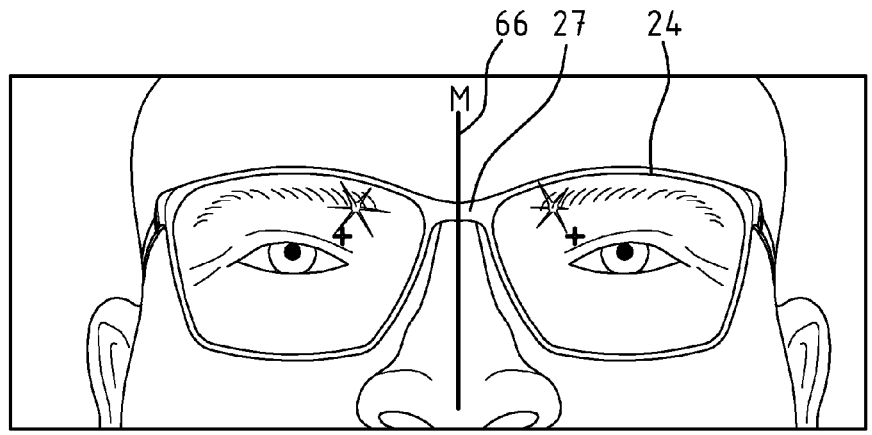
FIG. 13 shows image data with a bridge center.

To simplify the identification of image points in image data b(x), which lie on spectacle lenses 28 received in a spectacle frame 24, algorithm 34 contains a bridge center recognition routine 64 which, from image data b(x), determines a center M of bridge 27 of spectacle frame 24 indicated in FIG. 13. Bridge center identification routine 64 calculates by means of image processing the center of bridge 27 of spectacle frame 24 by determining the center of the edge of left and right spectacle lens 28 from image data b(x) captured by an image capture device 14, 16, 18. FIG. 13 shows the image data established with facial feature identifying routine 40 from image data b(x) in sought image section 38 (region of interest) with spectacle frame 24 and a bridge center 66 determined from image data b(x). It should be noted that bridge center 66 can also be determined for example with the aid of center points between detected pupil centers, with the aid of the position of the bridge of the nose, or with the aid of a weighted combination of these two features or by means of machine learning methods based on example data sets.

Bridge center identifying routine 64 in algorithm 34 transmits the information of bridge center 66 to a symmetry routine 68.

Figure 14:
FIG. 14 shows depth map information data.

Algorithm 34 also comprises a triangulation routine 69 that, from the information of image data b(x) of a further image 37, which is captured using another image capture device 14, 16, 18, calculates, by means of triangulation, depth map information data t(x) shown in FIG. 14, with the aid of calibration information in respect of image capture devices 14, 16, 18 known as an apparatus constant in a calibration routine 39.

Calibration information in respect of an image capture device 14, 16, 18 is understood to mean extrinsic properties such as the relative alignment of recording direction 19 in the space of an image capture device, i.e., the relative alignment of the optical axis of recording direction 19 as well as the intrinsic properties of image capture device 14, 16, 18, i.e., the properties of image capture device 14, 16, 18 which define how the coordinates of a point in space in a coordinate system referenced to corresponding image capture device 14, 16, 18, which is imaged in the image plane of image sensor 15 of image capture device 14, 16, 18, are transferred into the coordinates of the image point of this point that lies in the image plane of image sensor 15. A comprehensive description of the calibration of image capture devices in the form of cameras can be found for example on page 8 in the textbook "Multiple View Geometry in Computer Vision" by Richard Hartley and Andrew Zisserman, $2^{nd}$ edition, Cambridge University Press 2004, to which reference is hereby made and the disclosure whereof is included in the present description of the disclosure.

The information of depth map information data corresponds to a depth map in the form of a point cloud, which makes it possible to estimate the spatial extent of 3-D spectacle lenses for example in the form of planes as an approximation to the true glass contour.

Depth map information data t(x) are supplied to a routine for stereo recording 71.

Algorithm 34 contains a cost function routine 70. In cost function routine 70, edge information data g(x) of an edge information image g(x) shown in FIG. 8 as a gray-scale image 48 and color information data f(x) corrected for mirroring and reflections with the aid of spectacle lens models, shown in FIG. 9 as a gray-scale image 48, as well as symmetry evaluation data r(x) and stereo evaluation data d(x) which also contain the information of depth map information data t(x), are linked to spectacle lens data u(x) to form a deterministically optimizable cost function E(u). This cost function E(u) is then optimized deterministically in an optimization routine 75 of algorithm 34.

Figure 15:
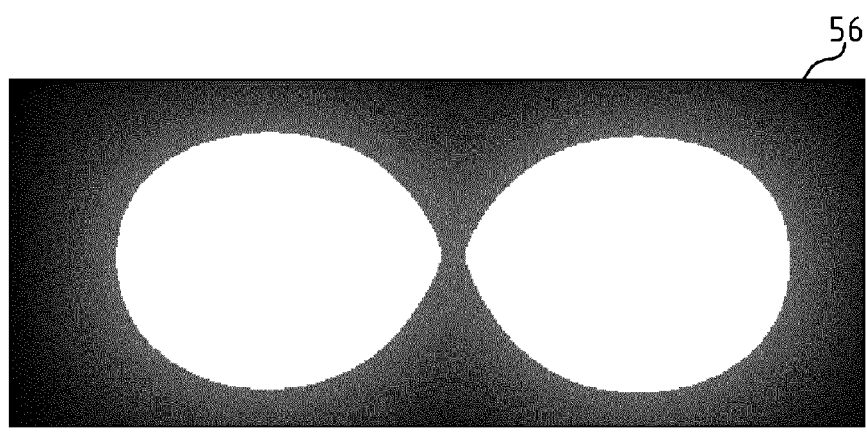
FIG. 15 shows a first representation of spectacle lens data.

FIG. 15 is a representation of spectacle lens data u(x) as initial data for an optimization routine 75 in algorithm 34 shown in FIG. 4. FIG. 15 shows spectacle lens data u(x) as a black-white image 56 in the form of the values of a binary function u: $\Omega \rightarrow \{0.1\}$, which assumes the value 1 inside the area of the spectacle lenses and the value 0 outside the area. $\Omega \subset \mathbb{R}2$ denotes the image coordinates of the image in which the spectacle lenses are to be detected. The so-called distributive derivative of this binary function then corresponds to sought edge 26 of a spectacle lens 28 shown in FIG. 2.

A representation of spectacle lens data u(x) can however also be, for example, a sequence of n points $p_1, \ldots, p_n \in \Omega$, which lie on edge 26 of a spectacle lens 28 shown in FIG. 2 and which thus describe this edge. A representation of spectacle lens data u(x) can also be a closed curve $\mathcal{C}: \mathbb{R} \to \Omega$ which describes the contour of a spectacle lens 28. Such curves can be parameterized in particular by a curve length. In order to guarantee a continuity and small curvature of the curves, it is possible to describe such curves for example as a linear combination of suitable basic functions, e.g., basic functions in the form of splines. It should also be noted that the spatial extent of spectacle lenses 28 can be represented by means of an implicit function, in particular with the aid of a 3-D function $\Omega \to \mathbb{R}^3$, the level sets whereof at a specified value, e.g., 0, i.e., the values of the definition range of this function which are imaged on the same value, define the edge of spectacle lens 28 in the form of an edge curve. At the same time, the negative values define the spectacle lens area and the positive values define the region outside the spectacle lenses or vice-versa.

Deterministically optimizable cost function E(u) generated in cost function routine 70 of algorithm 34 is reproduced below. The following applies:

$$E(u) := \mu E_{color}(u(x)) + E_{edge}(u(x)) + \delta E_{sym}(u(x))$$

with the color cost term $$E_{color}(u(x)) := \int_\Omega u(x) f(x) dx,$$

wherein spectacle lens data u(x) describe the spatial extent of at least one spectacle lens 28 held in spectacle frame 24 and wherein f(x) are the color information data established from image data b(x), and with the edge cost term $$E_{edge}(u(x)) := \int_\Omega g(x) |D u(x)|,$$

wherein D is the gradient of u in the distributive sense and the term calculates the contour length of the spectacle lenses weighed with edge information data g(x), which is at a minimum when the spectacle lens data edges agree with the detected edges from image data b(x), and with the symmetry cost term $$E_{sym}(u(x)),$$

which evaluates the symmetry of a left and a right spectacle lens 28 with respect to a central plane in spectacle frame 24, and with the stereo cost term $$E_{stereo}(u_i(x), u_j(x)),$$

$1 \leq i, j \leq n$, which relates points within the spectacle lenses to one another in a plurality of image views.

$\mu$, $\gamma$ and $\delta$ are weighting factors of the individual terms that determine the influence of the individual variables on the overall result.

In color cost term $E_{color}(u(x))$, the color of image data b(x) is correlated with spectacle lens data u(x) and evaluated. Edge cost term $E_{edge}(u(x))$ is a correlation of image edges in image data b(x) with the distributive derivative of the spectacle lens data function u(x). Symmetry cost term $E_{sym}(u(x))$ correlates symmetries contained in image data b(x) with spectacle lens data u(x), in that spectacle lens data u(x) reflected at the central plane through the bridge center and deviations of spectacle lens data u(x) from the reflected data are evaluated.

In symmetry cost term $E_{sym}(u(x))$, a 3-D symmetry assumption based on depth map information data t(x) can be calculated, according to which a left and a right spectacle lens in spectacle frame 24 is symmetrical to a 3-D plane, which is defined by linear bridge center 66 determined in bridge center identification routine 64 and by known calibration information of one of image capture devices 14, 16, 18 in device 10.

In symmetry cost term $E_{sym}(u(x))$, the established 3-D plane has assigned to it the function of a mirror plane, which images onto one another, in three-dimensional space, the points lying on a left and right spectacle lens, wherein deviations r(x) of actual and set-point values of this image are evaluated in symmetry cost term $E_{sym}(u(x))$. Symmetry term $E_{sym}(u(x))$ then assigns to spectacle lens data u(x), which correspond to two spectacle lenses which are not symmetrical to one another, cost values which are all the greater, the greater the deviations of the two spectacle lenses acting in algorithm 34 as symmetry evaluation data r(x). It is thus ensured that spectacle lens data u(x) found in the optimization of the cost function describe spectacle lenses symmetrical to one another. As an alternative to this, it is also possible to specify in a constraint that spectacle lens data u(x) found by the optimization of the cost function are symmetrical.

It should be noted that it is possible to calculate 2-D symmetrical assumptions in symmetry cost term $E_{sym}(u(x))$, even if no depth map information data are present, e.g., in that spectacle lens data u(x) of a left spectacle lens 28 is mirrored at bridge center 66 in the image plane of image sensor 15 of an image capture device 14, 16, 18 onto spectacle lens data u(x) of a right spectacle lens 29 and then in turn deviations r(x) from actual values in respect of set-point values are calculated which enter into the cost function.

It should be noted that calibration information in respect of a plurality of image capture devices, on the basis of image data u(x) which correspond to at least two images captured by means of the image capture device, make it possible to increase the robustness of the algorithm. In particular, such calibration information makes it possible, on the basis of image data b(x) in respect of these images, for an inner edge of the spectacle frame or an edge of the spectacle lenses to be optimized simultaneously in all or a plurality of images and for glass edge data $u_1(x), \ldots, u_n(x)$ to be able to be related to one another for two images in each case during the optimization by means of the calibration information in a stereo cost term $E_{stereo}(u_i(x), u_j(x))$. The glass edge data in the different images can thus be mutually influenced by the penalization of deviations of mutually corresponding points in $u_i(x)$ and $u_j(x)$, $1 \leq i, j \leq n$.

In order to relate the glass edge data established from two images $u_i(x)$ and $u_j(x)$ to one another, another cost term can also be introduced into cost function E(u) or a constraint can be specified for the optimization of the cost function, which is based on the calculation of stereo information. Such stereo information can contain the fact that, in respect of each image point in an image captured with a first image capture device, the image point is found in a second image, on which the same 3-D point is imaged. For this purpose, it is possible to use e.g., stereo algorithms which determine, for each point in each image pair, the associated disparity and therefrom the depth thereof in space. For a higher robustness, a 3-D model can also be adapted to these disparity maps or the associated depth maps. On the basis of this information, a constraint or a cost term can then be specified, which calculates a deviation, acting as stereo evaluation data (x), of spectacle lens data $u_1(x)$ from the associated stereo points in spectacle lens data $u_i(x)$. This stereo evaluation data d(x) can in particular be calculated for each image pair.

Stereo evaluation data d(x) can be taken into account as an additional cost term $E_{stereo}(u_i(x), (u_j(x)))$ in cost function E(u) or as a constraint in the optimization of cost function E(u), which ensures that no differences can arise between spectacle lens data u(x), which are based on different images, which are captured with one or more image capture devices.

Figure 16:
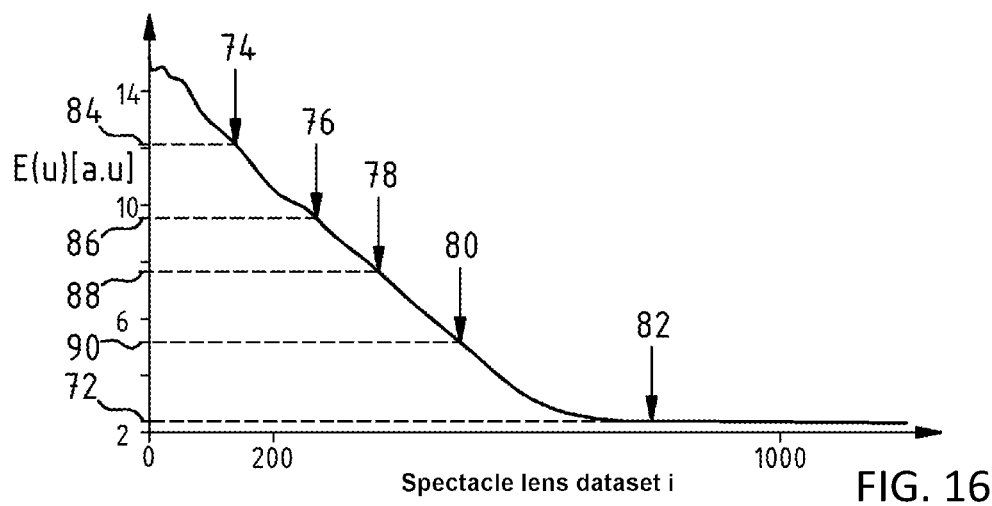
FIG. 16 shows values of a cost function for various spectacle lens data.
Figure 17:
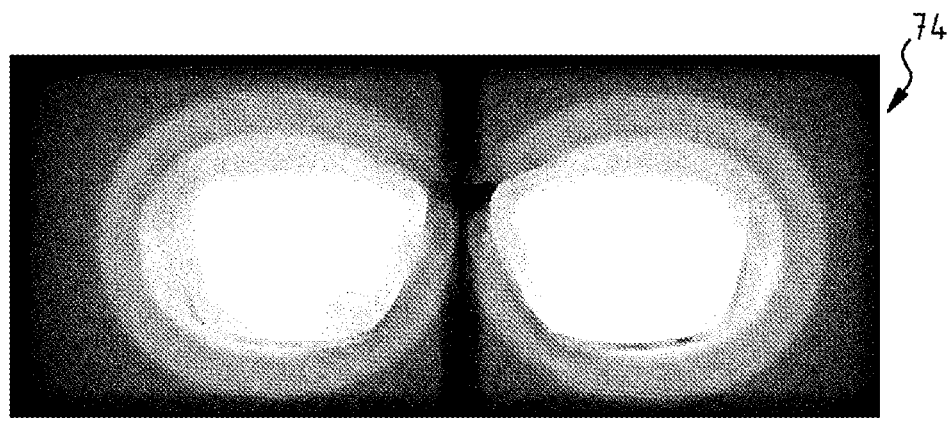
FIG. 17 shows as black-white image 56 spectacle lens dataset 74 corresponding to value 84 of the cost function E(u)
Figure 18:
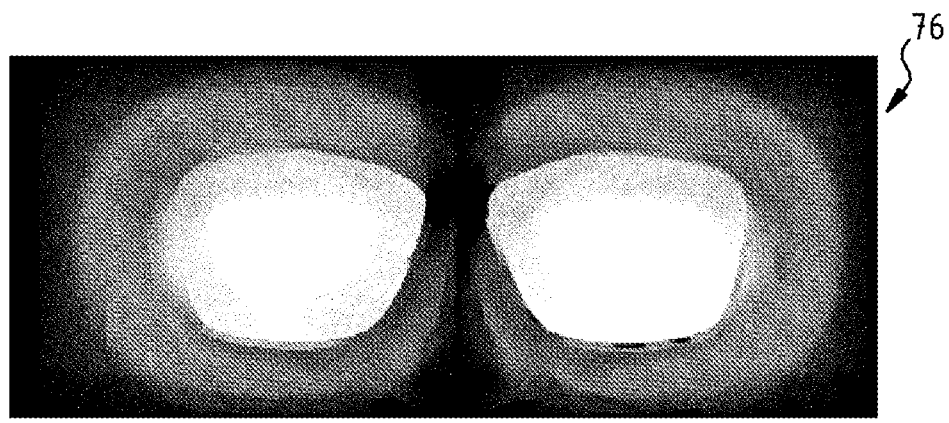
FIG. 18 shows as black-white image 56 spectacle lens dataset 76 corresponding to value 86 of the cost function E(u)
Figure 19:
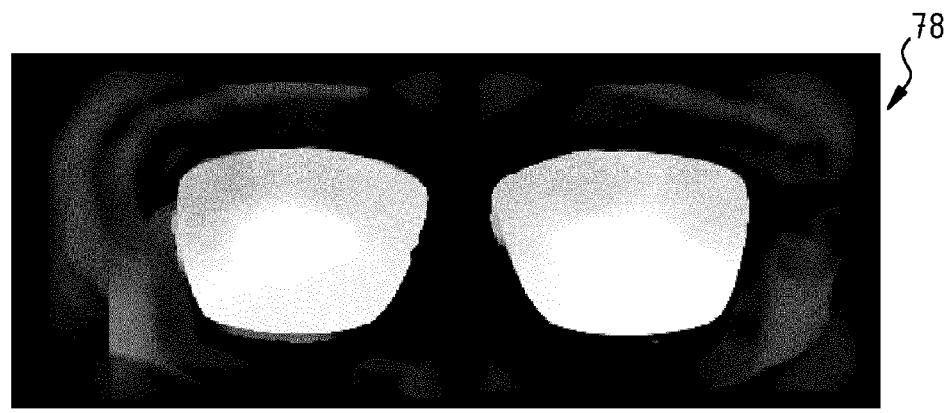
FIG. 19 shows as black-white image 56 spectacle lens dataset 78 corresponding to value 88 of the cost function E(u)
Figure 20:
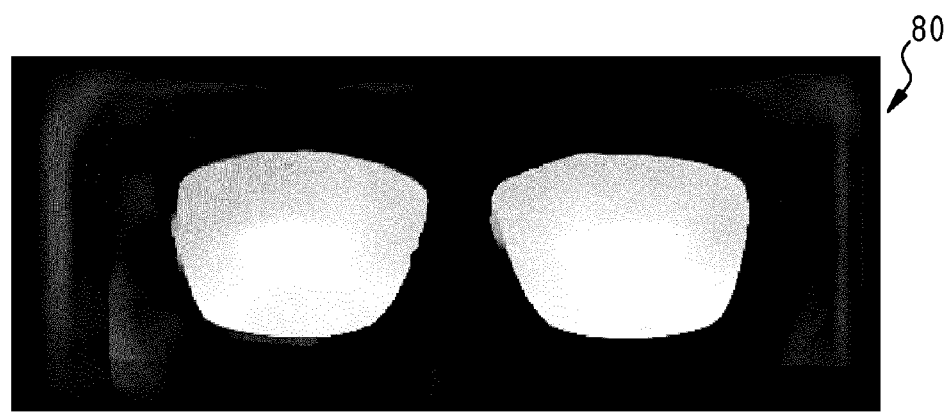
FIG. 20 shows as black-white image 56 spectacle lens dataset 80 corresponding to value 90 of the cost function E(u)
Figure 21:
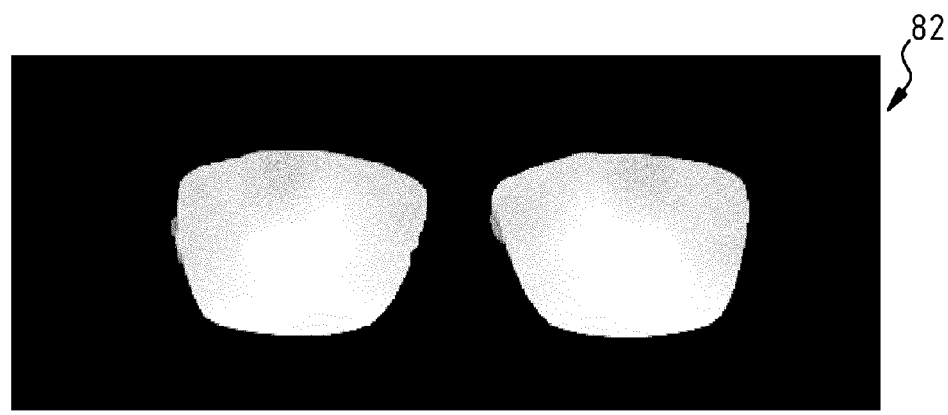
FIG. 21 shows as black-white image 56 spectacle lens dataset 82 corresponding to value 72 of the cost function E(u)

FIG. 16 shows the values of cost function E(u) for different intermediate results i=0, 1, 2, 3, . . . of the optimization routine for spectacle lens datasets with spectacle lens data u(x). By varying spectacle lens data u(x), cost function E(u) can be optimized to a minimum 72. This measure then makes it possible to find spectacle lens data u(x) which precisely describe the edge of a spectacle lens 28 matched to spectacle frame 24 worn by spectacle wearer 20.

Algorithm 34 contains an optimization routine 75, which determines spectacle data u(x) in respect of the cost function of cost function routine 70, at which cost function E(u) is at a minimum.

Figure 22:
FIG. 22 shows spectacle lens data u(x) found by optimization of cost function E(u).

FIG. 17 to FIG. 22 show as black-white images 56 representations 74, 76, 78, 80 and 82 in respect of different spectacle lens datasets i, i=74, i=76, i=78, i=80, i=82 relating to spectacle lens data u(x), which correspond to the values 84, 86, 88, 90 and minimum 72 of cost function E(u) indicated in FIG. 16. Spectacle lens data u(x) represented in FIG. 15 are an initial dataset, with the aid of which cost function E(u) is optimized. Spectacle lens data u(x) represented in FIG. 22 are those found by optimization of cost function E(u). They contain, in the form of the edge of two areas 94, 96, the information of the sought edge of spectacle lenses 28, which are suitable for the fitting into spectacle frame 24 worn by spectacle wearer 20 shown in FIG. 1. In algorithm 34, the sought edge of a spectacle lens 28 is determined from spectacle lens data u(x) found by optimizing cost function E(u) in an edge calculation routine 77. This edge calculation routine 77 can also make provision such that a lens outer edge is calculated from the sought bearing edge of a spectacle lens, e.g., by the fact that it is specified that the lens outer edge has a fixed distance from the established bearing edge of corresponding spectacle lens 28.

Cost function E(u) is therefore a sum of energy terms and is subject to constraints. 2-D and/or 3-D symmetry conditions are imposed on the spectacle lens data. The optimization of cost function u(x) takes place only within image data b(x) lying in the relevant image section 38.

The cost function specified is deterministically optimizable since each individual term is deterministically optimizable and hence so is the linear combination. In particular, $E_{color}(u(x))$ and $E_{edge}(u(x))$ are convex terms which can be globally optimized by methods such as primal-dual methods or gradient descent methods. $E_{sym}(u(x))$ can likewise be formulated as a convex term if the 3-D or 2-D mirror plane is known or is assumed as such. If the latter is concomitantly estimated during the optimization, the term is not convex, but can nevertheless be optimized by deterministic methods such that a usable solution is attained—e.g., by means of the optimization taking place alternately, i.e., the mirror plane being adapted in each case after a fixed number of steps on the basis of the current solution. The term $E_{stereo}(u_i(x), u_j(x))$ can likewise be formulated as convex if the stereo imaging between the individual image points is known. This is the case, for example, if a stereo algorithm was implemented beforehand on the basis of the image data. If the stereo imaging is estimated from the current solution during the optimization, then the term is no longer convex, but, like the symmetry term, can nevertheless be deterministically optimized alternately, such that a usable solution is attained.

It should be noted that it is possible to weight the energy terms in cost function E(u). In particular, it is possible to weight individual energy terms in cost function E(u) with the factor 0, i.e., to leave out individual energy terms in cost function E(u) and thus not to take account thereof. Moreover, it is possible to minimize the length of the edge of spectacle lenses 28, in particular by the first derivative of this curve. It is also possible to penalize deviations from the color model by taking account of a lens model and the information generated in the capture of mirroring and/or reflections. Finally, it should be noted that the 2-D and 3-D symmetry conditions taken into account in algorithm 34 and established from lens planes can be based on 3-D information, which also enables establishing of centering parameters.

In principle, cost function E(u) can be minimized in various ways. It is in particular possible to minimize cost function E(u) for example by continuous methods, primal-dual approaches, 'graph-theoretical methods,' discrete graph-cut methods, active contour models, and simplex methods or suchlike.

Continuous methods describe the image as a continuous function and therefore the cost function is defined on a continuous mathematical space. The discretization of the cost function on the basis of image points then does not take place until the last step before the optimization. In contrast with this, discrete optimization methods define the optimization function directly on pixel planes.

It should also be noted that, as is described in publication C. Niewenhuis et. al.: "Spatially Varying Color Distributions for Interactive Multi-Label Segmentation, IEEE Transactions on Pattern Analysis and Machine Intelligence," 35, 1 (2013), continuous methods have the advantage over discrete ones that they avoid artefacts on edges and can be parallelized much more easily. The parallelization enables in particular rapid calculations on a graphics card of a computer.

It should in particular be noted in this connection that the 2-D and 3-D symmetry conditions taken into account in algorithm 34 and established from lens planes are based on 3-D information, which also enables the establishing of centering parameters.

It should moreover be noted that the models of the form of spectacle lenses 28 described above can also be used as a constraint in the optimization of cost function E(u). Such a constraint may for example be that the established final edge of a spectacle lens 28 lies inside the previously learnt model space. It goes without saying that, instead of learning models from examples, the latter can also be defined.

Algorithm 34 described above can in principle also be carried out without carrying out one or more routines of the routines described above from the group of facial feature identifying routine 40, mirroring detection routine 58, spectacle lens position routine 60, bridge center identifying routine 64, or triangulation routine 69. Algorithm 34 described above can also be carried out without cost function E(u) to be optimized containing a symmetry cost term $E_{sym}(u(x))$ or being optimized by taking account of a symmetry constraint. Cost function E(u) to be optimized also does not necessarily have to contain at the same time a color cost term $E_{color}(u(x))$ and an edge cost term $E_{edge}(u(x))$.

In particular, algorithm 34 can also be carried out with image data b(x), which contain the information of only one image of spectacle wearer 20 shown in FIG. 1, captured with a single image capture device 16. Within the scope of the disclosure, image data b(x) do not necessarily have to be provided which are based on image data b(x) in respect of face 25 of spectacle wearer 20 with a spectacle frame 24 worn by the latter, the image data b(x) having been captured from different recording directions using one image capture device 14, 16, 18.

It should be noted that use can be made of the above-described process of establishing the representation of the edge 26 of a spectacle lens 28, 29 also when centering a left spectacle lens 28 or a right spectacle lens 29 in a spectacle frame 24.

In this regard, e.g., a step (i) can involve determining centering parameters with respect to the spectacle lens 28, 29, wherein determining the centering parameters comprises establishing the representation of the edge 26 of the spectacle lens 28, 29 as specified above, and a further step (ii) involves centering the spectacle lens 28, 29 in the spectacle frame 24 using the centering parameters determined in the preceding step (i).

A left spectacle lens 28 or a right spectacle lens 29 can be ground into a spectacle frame 24 by determining centering parameters in a step (i), wherein determining the centering parameters comprises establishing the representation of the edge 26 of the spectacle lens 28, 29 by a method specified above. A further step (ii) can then involve grinding the corresponding spectacle lens 28, 29 in for an arrangement in the spectacle frame 24 on the basis of the centering parameters determined in the preceding step (i).

A left spectacle lens 28 or a right spectacle lens 29 can also be produced by making use of a method step of grinding the spectacle lens 28, 29 into a spectacle frame 24 according to a method specified above.

It should be noted that use can also be made of one or more of the methods specified above when producing spectacles.

To sum up, the following typical features of the disclosure should be noted: The disclosure relates to a computer-implemented method for establishing the representation of edge 26 of a spectacle lens 28 or a left spectacle lens 28 and a right spectacle lens 29 for a spectacle wearer 20. According to the disclosure, the following steps are carried out for this purpose:

Provision of image data b(x) in respect of spectacle wearer 20 with a worn spectacle frame 24, Calculation of information data I(x) derived from image data b(x), Calculation of a deterministically optimizable cost function E(u) linking information data I(x) with spectacle lens data u(x), wherein spectacle lens data u(x) describe the spatial extent of at least one spectacle lens 28 held in spectacle frame 24, and Setting a curve of an edge 26 of spectacle lens 28 or of left spectacle lens and right spectacle lens 29 by optimization of cost function E(u).

The foregoing description of the exemplary embodiments of the disclosure illustrates and describes the present disclosure. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMBERS 10 device
12 column
14, 16, 18 image capture device
15 image sensor
19 recording direction
20 spectacle wearer
21 computer unit
22 input interface
23 output interface
24 spectacle frame
25 face
26 edge
27 bridge of spectacle frame
28 left spectacle lens
29 right spectacle lens
30 lateral face
31 vertical
32 coordinate system
34 algorithm
36 image
37 further image
38 image section
39 calibration routine
40 facial feature identifying routine
42 data sample
44 edge detection routine
46 edge information data
48 gray-scale image
50 color evaluation routine
52 color information data
54 mirroring/reflections
56 black-white image
58 mirroring detection routine
60 spectacle lens position routine
62 probability information data
64 bridge center identifying routine
66 bridge center
68 symmetry routine
69 triangulation routine
70 cost function routine
71 stereo assumption
72 minimum
74 representation
75 optimization routine
77 edge calculation routine
76, 78, 80, 82 representations of spectacle lens datasets for spectacle lens data u(x)
84, 86, 88, 90, values of cost function values E(u)
94, 96 area
A recording distance
bw distance spectacle lenses
b(x) image data set/image data
E grinding-in height
E(u) cost function
f(x) color information data
g(x) edge information data
HS corneal vertex distance
sb lens width sh lens height
d(x) stereo evaluation data
di(x) spectacle lens form information data
r(x) symmetry evaluation data
s(x) mirroring information data
t(x) depth map information data
u(x) spectacle lens data
w(x) probability values
α tilt angle
β frame lens angle

The invention claimed is:

1. A computer-implemented method for establishing a representation of an edge of a spectacle lens or of a left spectacle lens and a right spectacle lens for a spectacle wearer, the method comprising:
   providing an image of the spectacle wearer including image data relating to the spectacle wearer with a worn spectacle frame;
   providing information data concerning information of the image that are calculated from the image data of the image of the spectacle wearer;
   calculating a deterministically optimizable cost function linking the information data with spectacle lens data, wherein the spectacle lens data describe a spatial extent of the spectacle lens or of the left spectacle lens and the right spectacle lens held in the spectacle frame; and
   setting a curve of an edge of the spectacle lens or of the left spectacle lens and the right spectacle lens by optimizing the cost function.

2. A computer-implemented method for establishing a representation of an edge of a spectacle lens or of a left spectacle lens and a right spectacle lens for a spectacle wearer, the method comprising:
   providing an image of the spectacle wearer with image data relating to the spectacle wearer with a worn spectacle frame;
   providing information data concerning information of the image that are calculated from the image data of the image of the spectacle wearer;
   calculating a deterministically optimizable cost function linking the information data with spectacle lens data, wherein the spectacle lens data describe a spatial extent of the spectacle lens or of the left spectacle lens and the right spectacle lens held in the spectacle frame; and
   setting a curve of an edge of the spectacle lens or of the left spectacle lens and the right spectacle lens by optimizing the cost function,
   wherein the calculated data concerning information of the image are at least one of data concerning a color model, data concerning an edge image, data concerning a color probability distribution, or data concerning an object in the image.

3. A computer-implemented method for establishing a representation of an edge of a spectacle lens or of a left spectacle lens and a right spectacle lens for a spectacle wearer, the method comprising:
   providing an image of the spectacle wearer with image data relating to the spectacle wearer with a worn spectacle frame;
   providing information data concerning information of the image that are calculated from the image data of the image of the spectacle wearer;
   determining an image section of the image of the spectacle wearer from a facial feature of the spectacle wearer;
   calculating a deterministically optimizable cost function linking the information data with spectacle lens data and containing a sum of convex cost function terms, wherein the spectacle lens data describe a spatial extent of at least one spectacle lens held in the spectacle frame; and
   setting a curve of an edge of the spectacle lens or of the left spectacle lens and the right spectacle lens by optimizing the cost function,
   wherein the information data are edge information data calculated from section image data of the image section.

4. The method according to claim 1, wherein the information data comprise an edge information image that is established from the captured image data with an edge detection algorithm.

5. The method according to claim 4, wherein the edge detection algorithm contains an edge detector selected from the group consisting of a gradient, a color gradient, a Canny edge detector, and a directed filter, or
   wherein the edge detection algorithm accesses a filter bank with learnt edge detectors, or
   wherein the edge detection algorithm is a self-learning algorithm based on machine learning.

6. The method according to claim 1, wherein the information data comprise a color information image that is established from the captured image data by means of a color evaluation algorithm that evaluates a color of the image data.

7. The method according to claim 4, wherein the information data comprise a color information image that is established from the captured image data with a color evaluation algorithm configured to evaluate a color of the image data.

8. The method according to claim 7, wherein the cost function is a weighted sum of an edge detection cost term and a color evaluation cost term.

9. The method according to claim 7, wherein calculating information data derived from the image data comprises:
   establishing mirroring information data with an algorithm for identifying mirroring at the spectacle frame or at a spectacle lens received in the spectacle frame; or
   establishing mirroring information data with an algorithm for identifying mirroring at the spectacle frame and at a spectacle lens received in the spectacle frame;
   wherein the algorithm is configured to distinguish mirroring at the spectacle frame from mirroring at the spectacle lens.

10. The method according to claim 9, wherein at least one of the color evaluation algorithm or the edge detection algorithm take account of the mirroring information data calculated from the image data.

11. The method according to claim 8, wherein calculating information data derived from the image data comprises:
   establishing facial feature information data with an algorithm configured to identify facial features.

12. The method according to claim 11, wherein the color evaluation algorithm, the edge detection algorithm, or the color evaluation algorithm and the edge detection algorithm are configured to take account of the facial feature information data calculated from the image data.

13. The method according to claim 1, wherein the cost function for establishing the edge of the left spectacle lens and the right spectacle lens for a spectacle wearer evaluates at least one of:
   a symmetry of spectacle lens data; or points in spectacle lens data, imaged onto one another with a stereo condition, to form images that correspond to different recording directions of an image capture device.

14. The method according to claim 8, wherein calculating information data derived from the image data comprises establishing spectacle lens form information data with an algorithm configured to specify, on the basis of a spectacle lens model supplied to the algorithm or on the basis of a multiplicity of spectacle lens models supplied to the algorithm, a parametric model of a probability or a map representing probabilities about the probability that captured image data lie on a spectacle lens as spectacle lens form information data.

15. The method according to claim 8, wherein calculating information data derived from the image data comprises establishing spectacle lens form information data with an algorithm configured to specify, on the basis of a spectacle lens model supplied to the algorithm or on the basis of a multiplicity of spectacle lens models supplied to the algorithm, a 2-D form or a 3-D form of a spectacle lens that is receivable in the spectacle frame as spectacle lens form information data.

16. The method according to claim 8, wherein the color evaluation algorithm takes account of the spectacle lens form information data calculated from the image data.

17. The method according to claim 1, wherein the calculated information data derived from the image data comprise a bridge center established with a bridge center detection algorithm.

18. The method according to claim 1, wherein images recorded from at least two different directions of view form the basis of the provided image data in relation to the spectacle wearer.

19. The method according to claim 1, wherein the cost function contains at least one model learnt from data by machine learning.

20. The method according to claim 1, wherein the cost function is convex.

21. The method according to claim 1, wherein the curve of an edge of the spectacle lens or of the left spectacle lens and the right spectacle lens is set by deterministically optimizing the cost function.

22. A computer program stored on a non-transitory storage medium and comprising program code that, when loaded into, and executed on, a computer system, carries out the method according to claim 1.

23. An apparatus for establishing a curve of an edge of a spectacle lens or of a left spectacle lens and a right spectacle lens for a spectacle wearer, the apparatus comprising:
   at least one image capture device configured to provide an image of the spectacle wearer with image data relating to the spectacle wearer with a worn spectacle frame;
   an information providing unit configured to provide information data of the image that are calculated from the image data of the image of the spectacle wearer;
   a calculation unit configured to calculate a deterministically optimizable cost function linking the information data with spectacle lens data, wherein the spectacle lens data describe a spatial extent of the spectacle lens or of the left spectacle lens and the right spectacle lens held in a spectacle frame; and
   an optimization unit configured to set a curve of an edge of the spectacle lens or of the left spectacle lens and the right spectacle lens by optimizing the cost function.

24. An apparatus for establishing a curve of an edge of a spectacle lens or of a left spectacle lens and a right spectacle lens for a spectacle wearer, the apparatus comprising:
   at least one image capture device configured to provide an image of the spectacle wearer with image data relating to the spectacle wearer with a worn spectacle frame;
   an information providing unit configured to provide information data of the image that are calculated from the image data of the image of the spectacle wearer;
   a calculation unit configured to calculate a deterministically optimizable cost function linking the information data with spectacle lens data, wherein the spectacle lens data describe a spatial extent of the spectacle lens or of the left spectacle lens and the right spectacle lens held in the spectacle frame; and
   an optimization unit configured to set a curve of an edge of the spectacle lens or of the left spectacle lens and the right spectacle lens by optimizing the cost function, wherein the calculated data concerning information of the image are data concerning at least one of a color model, an edge image, a color probability distribution, or an object in the image.

25. An apparatus for establishing a curve of an edge of a spectacle lens or of a left spectacle lens and a right spectacle lens for a spectacle wearer, the apparatus comprising:
   at least one image capture device configured to provide an image of the spectacle wearer with image data relating to the spectacle wearer with a worn spectacle frame;
   an information providing unit configured to provide information data of the image that are calculated from the image data of the image of the spectacle wearer;
   a facial detection unit configured to determine an image section of the image of the spectacle wearer from a facial feature of the spectacle wearer,
   a calculation unit configured to calculate a deterministically optimizable cost function linking the information data with spectacle lens data, wherein the deterministically optimizable cost function includes a sum of convex cost function terms, and wherein the spectacle lens data describe the spatial extent of the spectacle lens or of the left spectacle lens and the right spectacle lens held in the spectacle frame; and
   an optimization unit configured to set a curve of an edge of the spectacle lens or of the left spectacle lens and the right spectacle lens by optimizing the cost function, wherein the information data are edge information data calculated from section image data of the image section.

26. A method for centering a left spectacle lens or a right spectacle lens in a spectacle frame, the method comprising:
   determining centering parameters with respect to the spectacle lens to establish a representation of the edge of the left spectacle lens or the right spectacle lens with the method according to claim 1; and
   centering the left spectacle lens or the right spectacle lens in the spectacle frame with the centering parameters.

27. A method for grinding a left spectacle lens or a right spectacle lens into a spectacle frame, the method comprising:
   determining centering parameters with respect to the spectacle lens to establish a representation of an edge of the spectacle lens with the method according to claim 1; and
   grinding the spectacle lens in for an arrangement in the spectacle frame on the basis of the centering parameters.

28. A method for producing a left spectacle lens or a right spectacle lens, the method comprising:
grinding the left spectacle lens or the right spectacle lens into a spectacle frame with the method according to claim 27.

29. A method for producing spectacles, the method comprising:
centering a spectacle lens with the method according to claim 26.

* * * * *